United States Patent [19]

Mizusawa et al.

[11] Patent Number: 4,947,190

[45] Date of Patent: Aug. 7, 1990

[54] INK JET RECORDING APPARATUS COMPRISING MECHANISM FOR CONVEYING SHEET-LIKE CLEANING MEDIUM TO A RECORDING REGION, DISCHARGE RECOVERY TREATMENT METHOD EMPLOYED IN THE SAME, AND CLEANING SHEET ALSO EMPLOYED IN THE SAME

[75] Inventors: Nobutoshi Mizusawa, Sagamihara; Ryuichi Ebinuma, Hiratsuka; Yuji Chiba, Isehara, all of Japan

[73] Assignee: Canon Kabushiki Kaisha, Tokyo, Japan

[21] Appl. No.: 269,679

[22] Filed: Nov. 10, 1989

[30] Foreign Application Priority Data

| | | | |
|---|---|---|---|
| Nov. 11, 1987 | [JP] | Japan | 62-283089 |
| Nov. 11, 1987 | [JP] | Japan | 62-283090 |
| Nov. 11, 1987 | [JP] | Japan | 62-283091 |
| Dec. 2, 1987 | [JP] | Japan | 62-303287 |
| Dec. 2, 1987 | [JP] | Japan | 62-303288 |
| Nov. 9, 1988 | [JP] | Japan | 63-281395 |

[51] Int. Cl.[5] ........................ G01D 15/18; B41J 2/165

[52] U.S. Cl. ................................ 346/140 R; 400/126; 346/1.1

[58] Field of Search ............................ 346/140 R, 1.1; 400/126

[56] References Cited

U.S. PATENT DOCUMENTS

| | | | |
|---|---|---|---|
| 2,886,841 | 5/1959 | Wilcox . | |
| 4,223,322 | 9/1980 | Raamsdonk | 346/140 R |
| 4,241,357 | 12/1980 | Anestos | 346/140 R |
| 4,369,456 | 1/1983 | Cruz-Vribe | 346/140 R |
| 4,450,456 | 5/1984 | Jekel | 346/140 R |
| 4,571,601 | 2/1986 | Teshima | 346/140 R |

FOREIGN PATENT DOCUMENTS

| | | |
|---|---|---|
| 2190060 | 1/1974 | France . |
| 2510041 | 1/1983 | France . |

*Primary Examiner*—George H. Miller, Jr.
*Assistant Examiner*—Scott A. Rogers
*Attorney, Agent, or Firm*—Fitzpatrick, Cella, Harper & Scinto

[57] ABSTRACT

An ink jet recording apparatus comprising: a non-contact print mode in which a medium to be recorded is conveyed to a region in which printing can be performed and is subjected to recording by discharging ink in a non-contact manner from a recording head confronting the medium at a predetermined interval; and a contact cleaning mode in which a cleaning sheet which has been conveyed into the region in which printing can be performed by using at least a part of a conveyance route for the medium is brought into contact with the recording head and then discharged from the region in which printing can be performed.

30 Claims, 23 Drawing Sheets

INK JET RECORDING APPARATUS COMPRISING MECHANISM FOR CONVEYING SHEET-LIKE CLEANING MEDIUM TO A RECORDING REGION, DISCHARGE RECOVERY TREATMENT METHOD EMPLOYED IN THE SAME, AND CLEANING SHEET ALSO EMPLOYED IN THE SAME

BACKGROUND OF THE INVENTION

1. Field of the Invention

The present invention relates to an ink jet recording apparatus and a discharge recovery method thereof. More particularly, the present invention relates to an ink jet recording apparatus, a discharge recovery method, and its cleaning medium, this apparatus having means for recovering its defective discharge or non-discharge, which means includes a sheet-like cleaning medium.

2. Related Background Art

An ink jet recording apparatus exhibits a multiplicity of advantages such that noise to be generated during its recording performance can be limited to a satisfactory low level and it can use plain paper at the time of recording. Therefore, it attracts a great attention.

In particular, a so-called ON-DEMAND type of ink jet recording apparatus uses a piezoelectric element or a magnetostrictive element each of which is an electromechanical transducing element or an exothermic resistance element which is an electrothermal transducing element. It performs recording by discharging ink from its discharge ports by rapidly applying a pressure to the ink positioned in an energy acting chamber thereof or in the vicinity thereof at the time of performing the recording. It exhibits a great advantage such that it does not need to be provided with any means for recovering unnecessary ink or a high potential power source for polarization. The reason for this lies in that it consumes ink by discharging an ink droplet as needed for performing recording.

As described above, the ink jet recording apparatus exhibits various advantages. However, it can generate cloggings due to adhesions of dust or paper dust generated from the recording paper, invasion of air bubbles into the inside of the discharge port, or increase in the viscosity of the ink due to the evaporation of the ink positioned in the vicinity of the discharge port. As the case may be, ink can be dried and solidified.

Therefore, it is critical for the ink jet recording apparatus to perform proper treatments (abbreviated to ink jet recovery treatment) for the purpose of overcoming these various factors which can deteriorate the recording quality.

A method is well known, as the method of recovering the ink jet, that an ink absorber made of a polymeric porous material or the like is pressed to the discharge port (for example, see U.S. Pat. No. 4,223,322). According to this method, utilizing a fact that ink which has been brought into contact with the ink absorber is taken out through the jetting port due to a capillary phenomenon, the above-described ink whose viscosity has been increased or the air bubbles can be, together with the thus-taken out ink, discharged outside the discharge port. Furthermore, since this method is a method in which the ink absorber is directly brought to abut against or contact the discharge port, it can effectively act to remove an ink droplet or dust stacked to the end surface of the discharge port in addition to its original action to take out the ink in the discharge port, these ink droplet or dust stacked to the end surface of the discharge port causing non-discharge failures or directional errors through which the ink droplet flies, which error being a so-called slippage.

As the other discharge recovering method, there is a method in which a pump or the like is used so as to forcedly discharge ink disposed in the vicinity of the discharge port (for example, see U.S. Pat. No 4276554, U.S. Pat. No. 4599625, U.S. Pat. No. 4419677, U.S. Pat. No. 4543591, U.S. Pat. No. 4410900, U.S. Pat. No. 4383263).

This method can be divided into two types, one of which is a method in which the pressure of the ink in the discharge port is increased so as to inject the ink in the vicinity of the discharge port, and the other is a method in which the pressure in the outer portion of the discharge port is decreased so as to absorb the ink in the vicinity of the discharge port. In either of these methods, since ink flows from the discharge port, it is preferable to provide a member for absorbing and accumulating the discharged ink (abbreviated to "waste ink" hereinafter).

Specifically, as a member for instantaneously absorbing the waste ink discharged from the discharge port, a polymeric porous material or the like is used. As the accumulating member, an accumulating reservoir, a so-called waste liquid tank, which accumulates the waste ink which has been temporarily captured by the absorbing member is generally used. For example, see U.S. patent application Ser. No. 786,179 filed on Oct. 10, 1985 and U.S. Pat. No. 4,682,184.

The characteristics required for this absorbing member and the above-described ink absorber for use in the discharge recovering method are completely the same as each other. Therefore, it is possible to make this absorbing member have three functions (A) to absorb out the ink in the discharge port, (B) to remove an ink droplet or dust stacked to the end surface of the portion in the vicinity of the discharge port, (C) to instantaneously absorb the waste ink which has been forcedly discharged through the discharge port. In general, since such absorbing member has the three functions (A) to (C), it is disposed at the position opposing the discharge port, and is communicated with a waste liquid tank positioned at the predetermined position with a flexible tube or the like.

As a recovery method which is effective to the above-described cloggings, invasion of air bubbles, increase in the viscosity of ink and solidifications of ink, there is a method of forcibly discharging the ink in the vicinity of the discharge port.

However, in the ink jet recording method, and more particularly in an ink jet recording head comprising a so-called full-multi type (full-line type) of recording head in which the discharge port are arranged in the range which corresponds to the width of the recording medium, the platen for restricting the recording surface is disposed closely to and opposing the overall range of the provided discharge port. Therefore the platen and the absorbing member need to be replace each other at the time of performing the above-described discharge recovery. Furthermore, it is required to bring the absorbing member into abutment against the discharge port.

To this end, an apparatus was disclosed in which the platen thereof is brought to a position far away from the recording head thereof, and the absorbing member can be, in this state, opposed to the recording head (the apparatus disclosed by the assignee of the present invention in U.S. Pat. No. 4,692,778). However, it is preferable to make the movable range of the platen and/or absorbing member as small as possible so as to replace the size of the recording apparatus. It is rather preferable to omit this.

Furthermore, since its waste liquid tank, of course, has its capacity, it needs to be provided with a sensor for detecting the fact that the tank has been filled and a proper means for notifying the operator, in accordance with this detection, the fact that the waste liquid tank has been filled in order to prevent the overflow of the tank. In addition, the operator needs to replace the waste liquid tank which has been filled with the waste ink with a new one. Such changing operation causes a problem that hands are contaminated during this changing work.

SUMMARY OF THE INVENTION

To this end, an object of the present invention is to provide a simple and small sized ink jet recording apparatus capable of assuredly performing recovery treatment and does not need to be provided with a complicated mechanism or a large space for replacing the platen and the absorbing member. Furthermore, this ink jet recording apparatus does not need to be provided with a waste liquid tank and detection and notification of the time at which the tank needs to be replaced are omitted.

Although the inventors of the present invention have applied an invention which also can achieve the above-described object in U.S. patent application Ser. No. 131,083 on Dec. 9, 1987, corresponding European Pat. No. 87118269.7 filed on Dec. 12, 1987, it is an another object of the present invention to provide an ink jet recording apparatus which can further practically and effectively perform recovery and cleaning.

Another object of the present invention is to provide a special cleaning medium for use in the above-described apparatus.

Another object of the present invention is to provide an apparatus which can be significantly practically structured, capable of, in a short time, recovering the defective recording, and assuredly cleaning all of the discharge ports with respect to a so-called multi-type recording head.

A further specific object of the present invention is to provide cleaning means capable of make the cleaning state of the recording head stable for the purpose of achieving the above-described objects.

A still further object of the present invention is to provide a whole apparatus for, without involving any problems, discharging the cleaning medium used in the present invention.

Another object of the present invention is to provide a specific sequence and a method for a cleaning mode (preferably including a discharge recovery step) applied to the above-described apparatus.

The residual object of the present invention can be understood when reading the following detailed description of the present invention together with the drawings.

DETAILED DESCRIPTION OF THE PREFERRED EMBODIMENTS

The present invention will now be in detail described with reference to the drawings.

Embodiment 1

Figure 1:
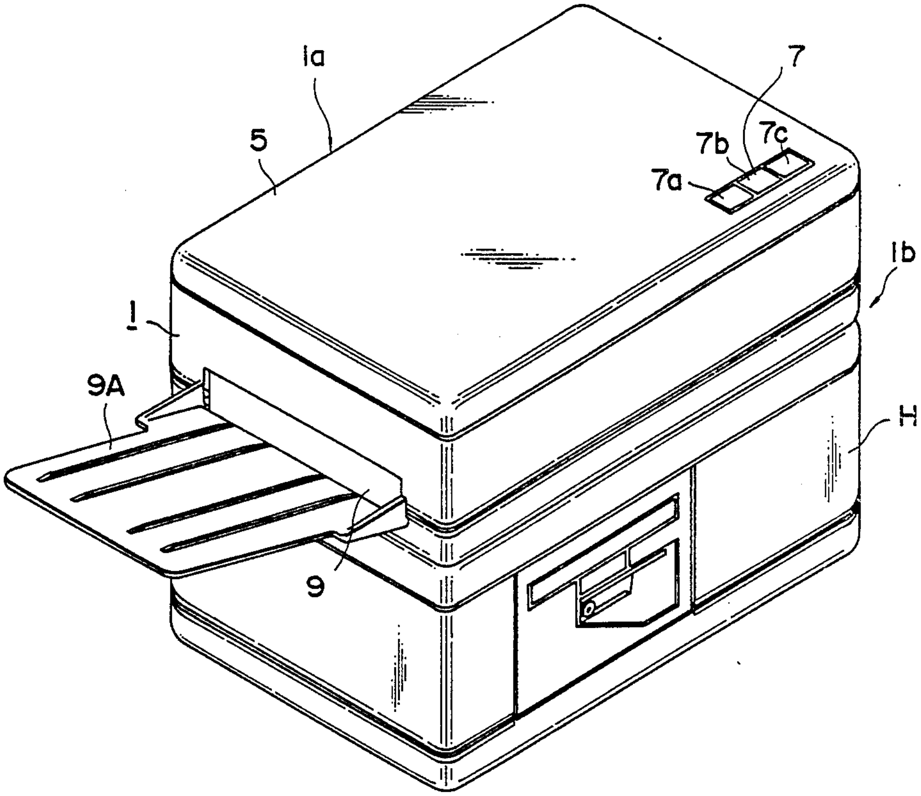
FIG. 1 is a perspective view illustrating the outline of an ink jet apparatus according to an embodiment of the present invention.

FIG. 1 is a perspective view illustrating an example of an outline of an ink jet recording apparatus to which the present invention is applied.

In this drawing, reference numeral 1 represents a main body unit portion comprising an upper unit 1*a* and a lower unit 1*b*. This upper unit 1*a* can be arranged to vertically rotate with respect to the lower unit 1*b* around a hinge or the like. The upper unit 1*a* is provided with a recording head IJH, electric circuit portion 103, fan 150, discharge roller POR, conveying roller PSR, paper guide 201 and a paper supply roller PFR. On the other hand, the lower unit 1*b* is provided with a platen PTN, an ink tank 231, paper exhaust tray 9A and idlers PR1 and PR2. Furthermore, the lower unit 1*b* is provided with a paper cassette accommodating the recording medium at the time of recording or a cassette, to be described later, accommodating the cleaning paper at the time of performing discharge recovery treatment. Reference numeral 5 represents a cover disposed in such a manner that it covers the upper side of the main body unit portion 1. This cover 5 is provided with an operation portion 7 in which command switches 7*a* and 7*b* such as ON-LINE SWITCH with the host device H, recording start instruction switch and a discharge recovery treatment starting switch or the like and a display 7*c* for performing display of modes are disposed. Reference numeral 9 represents a paper exhausting port disposed on one side surface of the apparatus. The recording medium to which recording has been performed is to be stacked on the paper exhaust tray 9A through the paper exhausting port 9.

Figure 2:
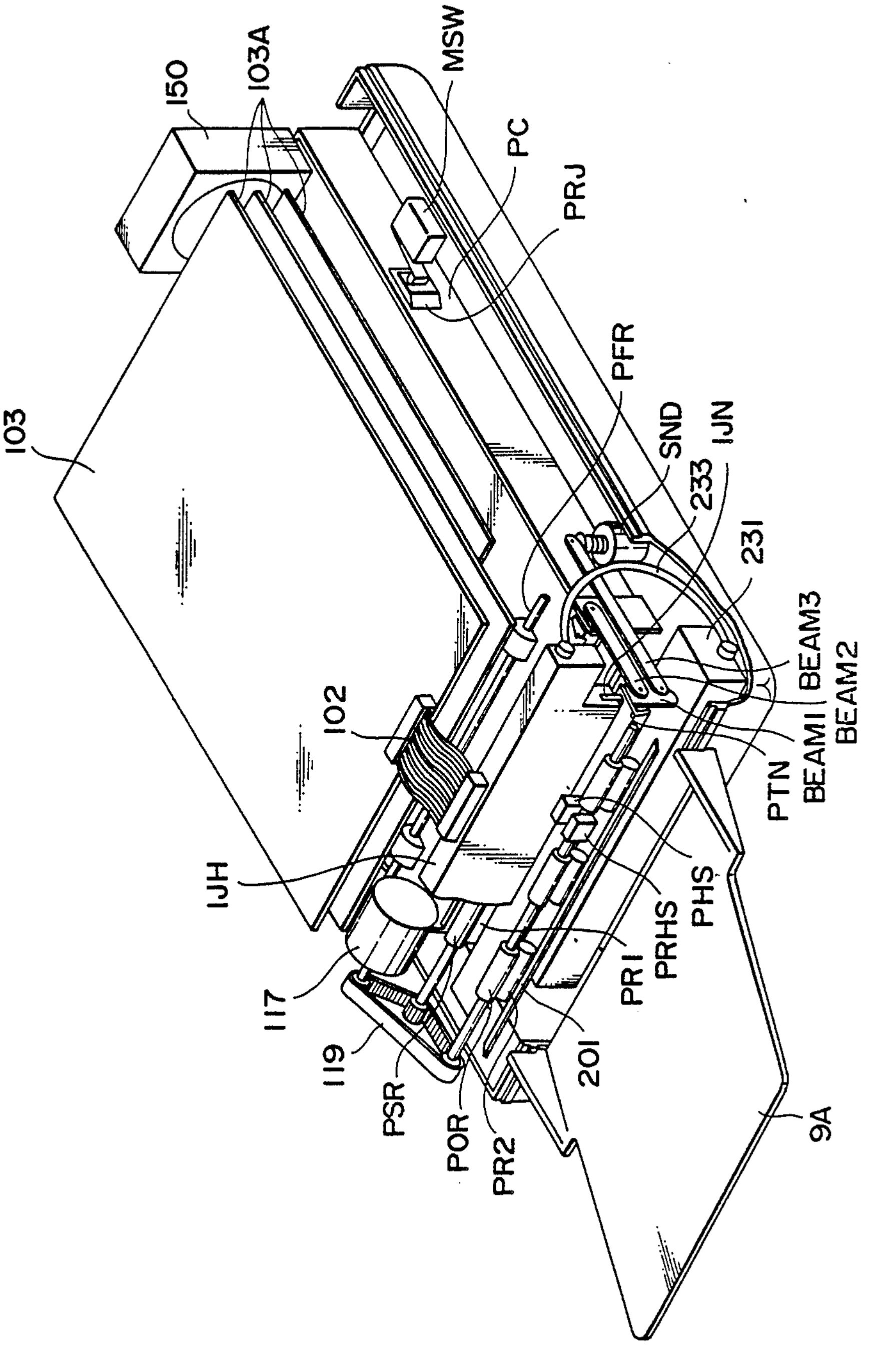
FIG. 2 is a view illustrating the structure of the inner portions.

FIG. 2 is a schematic perspective view illustrating the inner structure of the apparatus shown in FIG. 1 in which a state where the cover 5 of the apparatus shown in FIG. 1 is removed. In FIG. 2, symbol IJH represents an ink jet recording head disposed in the vicinity of the paper exhausting port 9, and is arranged to be a so-called full-multi type of ink jet recording head in which discharge port IJO are arranged, at a density of 16/mm, corresponding to the overall width (for example, an A4 size recording paper) of the width (for example, one line recording region) through which recording can be performed in this apparatus. Furthermore, at a proper position in a nozzle or the like, an electromechanical transducing element (not shown) or an electrothermal transducing element not shown is disposed so that discharging energy is applied to the ink in accordance with supply of the driving signal from the host device H corresponding to the image to be recorded. As a result of this, ink is caused to be discharged from the discharge port IJO. In this embodiment, this recording head JIH is disposed in such a manner that the discharge port IJO of each of the liquid flow passes opens vertically downwards.

Reference numeral 103 represents a main electric circuit portion of the apparatus according to the present invention which is structured in such a manner that a driver circuit for driving a recording head 101 through a flexible cable 102, power source circuit, control circuit, a circuit in each portion of the apparatus, and an interface circuit with the host device H disposed outside the apparatus are mounted on a substrate 103A. In this embodiment, since this electric circuit portion 103 is disposed on the same side of the upper unit 1*a* with the recording head IJH, affection of the ink is not made upon the electric circuit portion 103 even if unexpected ink leakage occurs. That is, even if ink is leaked through the discharge port IJO, the affection of the ink does not make upon the main electric circuit portion 103 of the apparatus according to the present invention since the liquid flow path for the leaked ink is formed in the lower unit 1*b* and the electric circuit portion 103 is disposed higher than this liquid flow pass. Furthermore, in this embodiment, this electric circuit portion 103 is disposed higher than the position at which each discharge port IJO in the recording head IJH. As a result of this, the affection of the ink is further prevented from the electric circuit portion 103. However, the above-described positional relationship between the electric circuit portion 103 and the discharge ports IJO is not critical.

Furthermore, symbol PFR represents a paper supply roller formed by cutting a part of a circular arc, this being a roller for supplying a recording medium S from a cassette 221 for accommodating the recording medium S such as paper, a film or cloth to the recording head IJH.

Symbols PSR and POR respectively represent an exhaust roller which is disposed in the passage through which the recording medium is conveyed and positioned in the upper stream to the recording position by the recording head IJH and a paper exhaust roller disposed in the vicinity of the paper exhausting port 9 in the lower stream. These rollers PSR and POR are rotated by a motor 117 with a timing belt 119. In accordance with this rotation, the conveying roller PSR and the paper exhausting roller POR are made opposed each other. They convey the recording medium in such a manner that this recording medium is sandwiched with cooperation with the idlers PR1 and PR2 which are elastically supported in the vertical direction in this drawing to the recording position or perform exhausting from this recording position to the paper exhausting tray 9A.

Reference numeral 201 represents a paper guide disposed on the passage through which the recording medium is conveyed and acts to restrict this passage. Symbol PTn represents a platen disposed so as to oppose the discharge port of the recording head IJH and acts to restrict the recording surface, this platen being able to be moved in the ink discharge direction by a mechanism to be described with reference to FIGS. 4, 6 and 7.

Figure 3:
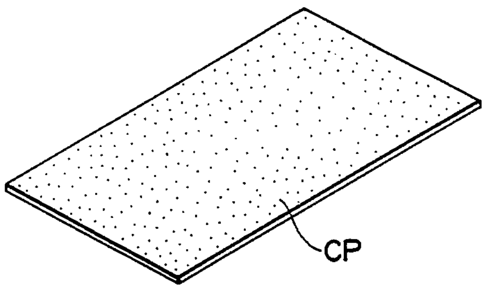
FIG. 3 is a perspective view illustrating a cleaning paper for use in the present invention.

Symbol PC represents a paper cassette for stacking the recording medium, and it is replaced by a cleaning paper cassette CPC for stacking, in a layered manner, sheets CP (called "cleaning paper" hereinafter) made of an ink absorbing material shown in FIG. 3 at the time of performing discharge recovery treatment. The recording medium stacked in the paper cassette PC or the cleaning paper cassette CPC, the recording medium stacked in the cleaning paper cassette CPC and the cleaning paper CP are conveyed below the discharge port of the recording head IJH after they have been individually separated by the paper supplying roller PFR.

Reference numeral 231 represents an ink tank serving as the ink supply source to the recording head IJH. It is disposed below the platen PTN and supplies ink to the recording head IJH through a flexible tube 233.

Symbols PHS and PRHS represent photosensors of a reflection type for performing jam detection of the recording medium or for detecting the position of the cleaning paper PC. Symbol MSW represents a microswitch which is turned on by a projecting portion PRJ disposed on the side surface of the paper cassette PC. By designing the structure in such a manner that this projecting portion PRJ is not provided in the cleaning paper cassette CPC, the judge whether the cassette inserted into the apparatus is the paper cassette PC or the cleaning paper cassette CPC can be made.

Figure 4:
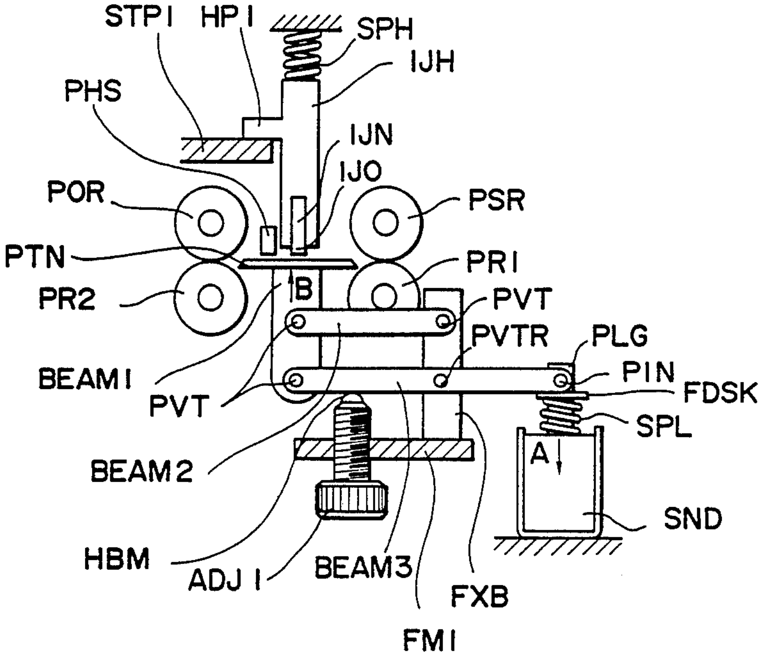
FIG. 4 is a view illustrating a platen moving mechanism in the recording region according to an embodiment of the present invention.

FIG. 4 is a schematic cross-sectional view illustrating a portion in the vicinity of the platen PTN, and illustrating a mechanism according to a first embodiment for bringing the sheet-like ink absorber to the discharge port in the recording head.

In this drawing, symbols BEAM1, BEAM2, BEAM3 and FXB represent beam members, each of these beam members constitutes a parallel link mechanism by way of being rotatably journalled by either of the two corresponding two pivots PVT or PVTR. An end of the beam member BEAM1 is joined to the platen PTN and the surface of the platen PTN, while an end of the beam member BEAM 3 is rotatably connected with a plunger PLG of a solenoid SND by a pin PIN. Furthermore, an end of the beam member FXB is secured to a frame FM1 of the apparatus.

Symbol HP1 represents an abutting portion disposed in the recording head IJH, while symbol SPH represents a head supporting spring which can be brought into contact with both the frame and the recording head IJH. This head supporting spring SPH abuts against the abutting portion HP1 of the recording head IJH by the urging force thereof against a stopper secured to the frame so that the recording head IJH can be always positioned at a predetermined height. Furthermore, it has a roll to be deformed when the force applied to the recording head IJH through the cleaning paper to be described later exceeds a predetermined level for the purpose of preventing breakage of the recording head.

When the solenoid SND is operated, the plunger PLG is retracted in the direction designated by an arrow A in the drawing, while the plunger PTN is, by the link mechanism, moved in the direction designated by an arrow B in the drawing, that is in the direction in which it can be brought into abutment with the discharge orifice IJO disposed on the end surface in the lower portion of the recording head IJH.

Symbol SPL represents a compression spring, and symbol FDSK represents a flange, this compression spring SPL making the flange FDSK into abutment with an end of the beam member BEAM3 so that it is interposed between this flange FDSK and the end surface of the solenoid SND is such a manner that it surrounds the plunger PLG. As a result of this structure, the urging from due to the compression spring SPL makes the beam member BEAM 3 rotate relative to the pivot PVTR counterclockwise in the drawing, and make a part of the same brought into abutment with the front beam supporting portion HBM of an adjusting screw ADJ1.

As a result of this, when the solenoid is not operated, it fixes the position of the platen PTN, while the interval between the platen PTN and the discharge port IJO can be determined by adjusting the adjusting screw ADJ1.

An operative procedure of the discharge recovery treatment according to the above-described structure will be described with reference to a flow chart shown in FIG. 5.

If non-discharge occurs in the recording head IJH caused from increase in the viscosity of the ink or the like, a user pushes a discharge recovering switch disposed in the operation portion 7 for the purpose of performing a discharge recovery treatment As a result of this, the operative procedure of the discharge recovery treatment starts. During the recording performance by the apparatus, first it needs to wait for completion of the recording (steps S501 and S515). Next, depending upon the state of the microswitch MSW, it is determined cassette whether the inserted is the paper cassette PC or the cleaning paper cassette (step S502). If the switch MSW is turned on, that is, the paper cassette PC is inserted, display means, for example, a display lamp disposed in the operation portion 7 and indicating a fact that the cleaning paper cassette CPC is not inserted is turned on and off (step S516) for the purpose of urging the user to switch between the cleaning paper cassette CPC and the paper cassette PC. In this state, as an alternative to the display lamp employed, the fact that the cleaning paper cassette CPC is not inserted may be notified by display means such as voice or the like.

After the insertion of the cleaning paper cassette has been confirmed, the paper supplying roller PFR is, similarly to the case where the recording medium is supplied, rotated (step S503) so that the uppermost sheet of the stacked cleaning paper CP in the cassette is separated, and is supplied to the paper supplying roller PSR.

The paper supplying roller PSR and the paper exhausting roller POR are rotated (step S504) so that the cleaning paper CP is supplied in the direction toward the paper exhausting tray 9A (step S517). Then, the front end of the cleaning paper CP passes through the lower portion of the recording head IJH, and it reaches a position below the photosensor PHS so that this photosensor PHS is turned on. In this state, this photosensor PHS acts as means to confirm a fact that the front end of the cleaning paper CP has completely passed the lower portion of the recording head IJH.

When the photosensor PHS is turned on (step S505), a controller (omitted from illustration) substantially simultaneously performs the following two operations. That is:

(i) a counter value $m_1$ corresponding to a predetermined amount of paper conveyance is set in the counter which controls the amount of paper conveyance (step S506) (this counter value is a value to be decreased in proportion to the amount of conveyance of the cleaning paper CP)

(ii) a pump for supplying ink from the ink chamber 231 to the recording head IJH is ignited so that the pressure of the ink in the recording head IJH is raised. As a result of this, the ink whose viscosity has been increased or the air bubbles positioned near the discharge port are forcedly discharged through the discharge port (step S506).

The counter value $m_1$, for example, corresponds to the number of pulses for controlling a stepping motor when the motor 117 for driving the paper supplying roller PSR and the paper exhausting roller POR is a stepping motor. When the stepping motor rotates by the degree corresponding to a pulse and thereby the cleaning paper CP is supplied (step S518), the value is decreased by one. When the value becomes $m_1=0$ (step S507), a controller (omitted from illustration) stops the rotation of the motor 117. Simultaneously with the stoppage of the motor 117, the pump is also stopped (steps S508 and S509). If the pump is operated with the cleaning paper CP stopped, the amount of the waste ink flowed from the discharge orifice immediately exceeds the ink absorption performance of the cleaning paper CP of a thin sheet-shape whereby the ink overflows the cleaning paper CP since the cleaning paper CP cannot absorb the ink, causing contamination of the other component parts. However, by conveying the cleaning paper CP at the speed at which the flow rate of the waste ink can be completely absorbed, even if the thin sheet-shape ink absorber does not cause the above-described problem. Therefore, by accelerating or decelerating the feeding speed in accordance with the ink absorption performance of the cleaning paper CP, the cleaning paper CP can be further effectively used.

The distance through which the cleaning paper CP is fed and which is restricted by the above-described counter value $m_1$, as can be clearly seen from the above description, corresponds to the region in which the waste ink has been absorbed. The counter value $m_1$ is set to a level which allows a marginal portion in which the waste ink has not been absorbed in the portion behind the waste ink absorbing region. Although the waste ink which has been once absorbed by the cleaning paper CP adheres to the paper exhausting roller POR when the waste ink absorbed region is exhausted, the above-described marginal portion can absorb the waste ink stacked to this roller POR so that the surface of the exhausting roller POR is cleaned. Therefore, it is preferable for $m_1$ and the length of the cleaning paper CP that the marginal portion can be at least remained by the length corresponding to the circumference of the paper exhausting roller POR.

When rotation of the paper supplying roller PSR is stopped (step S509), the solenoid SND is then operated (step S510) so that the platen PTN is moved in the direction designated by the arrow B through the parallel link mechanism. As a result of this action, the platen PTN sandwiches the cleaning paper CP cooperating with the liquid flow pass IJN in the recording head IJH. As a result of this, the cleaning paper CP is abutted against the discharge orifice IJO. The solenoid SND is brought to a turned-off state after it has operated for a predetermined time period (step S511) so that the cleaning paper CP is separated from the discharge orifice IJO and it restores its original state. As a result of the abutment of the cleaning paper CP against the discharge orifice IJO, the dust or ink stacked which cannot be removed solely by flowing the ink by the operation of the Pump can be removed.

The cleaning paper CP after it has been released from the abutment is again conveyed by the paper supplying roller PSR and the paper exhausting roller POR (step S512 and S519). When the rear end of the cleaning paper CP passes the exhausting roller POR and then passes the photosensor PRHS, the photosensor PRHS is changed from the turned on state to the turned off state (step S513). Therefore, the controller (omitted from illustration) judges whether the cleaning paper CP has been exhausted from the paper exhausting port 9 to the outside of the apparatus, and stops the rotation of each of the exhausting rollers POR and the paper supplying roller PSR (step S514). As a result, the discharge recovery treatment is completed.

Embodiment 2

Figure 6:
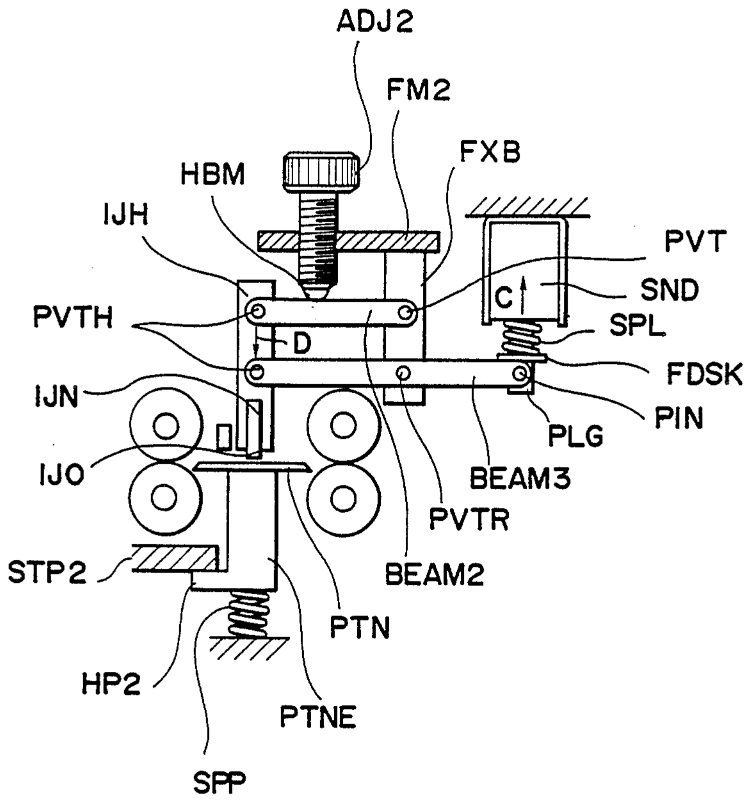
FIG. 6 is a view illustrating a recording head moving mechanism in the recording region according to the present invention.

FIG. 6 is a schematic cross-sectional view illustrating a portion in the vicinity of the platen PTN, and illustrating a mechanism for abutting the sheet-shape ink absorber against the discharge port of the recording head according to a second embodiment. The similar elements to those shown in FIG. 4 are given the same reference numerals and their descriptions are omitted.

The difference from the first embodiment shown in FIG. 4 lies in that the element for abutting the ink absorber against the nozzle discharge port IJO is the recording head IJH as an alternative to the platen PTN. Therefore, the link mechanism is constituted by four parts the beam members BEAM 2, BEAM3, FXB and the recording head IJH. Similarly to the embodiment shown in FIG. 4, an end of the beam member BEAM 3 is joined the plunger PLG of the solenoid SND. By driving the solenoid SND in the direction C designated by an arrow in the drawing, the recording head IJH is moved in the direction D designated by an arrow in the drawing so that the discharge port IJO is brought into abutment with the cleaning paper CP.

Similar to the embodiment shown in FIG. 4, the stationary beam member FXB is secured to the frame FM2 of the apparatus, while the front end HBM of the adjusting screw ADJ2 is abutted to a partial portion of the beam member BEAM2. Furthermore, by the presence of the compression spring SPL inserted between the securing portion of the plunger PLG of the beam member BEAM3 and the end surface of the solenoid SND and the flange FDSK, the height adjustment of the recording head IJH at the stationary state is performed.

Furthermore, symbol PTNE represents a platen supporting member, and an end thereof is joined perpendicular to the surface of the platen, while another end thereof is joined to the platen supporting spring SPP secured to the apparatus. Furthermore, the platen supporting member PTNE is provided with a butting portion HP2. As a result of this, the platen supporting spring SPP abuts the butting portion HP2 against the stopper STP2 secured to the frame so that the height of the platen PTN is always maintained at a predetermined height. Furthermore, it deforms when the force applied to the recording head through the cleaning paper CP exceeds a predetermined level due to the movement of the recording head IJH in the direction toward the platen PTN so that the breakage of the recording head IJH is prevented.

The discharge recovery treatment action by means of the above-described structure is substantially the same as that with the first embodiment. The difference lies in that, as described above, that as an alternative to the movement of the platen PTN, the cleaning paper CP is sandwiched by the discharge port IJO and the platen PTN due to the movement of the recording head so that the discharge port IJO is cleaned.

Embodiment 3

Figure 7:
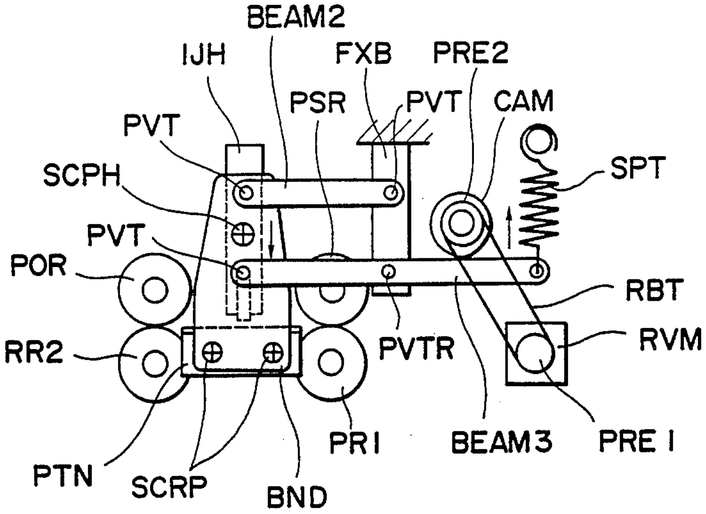
FIG. 7 is a view illustrating an embodiment whose structure is different from that shown in FIG. 6.

FIG. 7 is a schematic cross-sectional view illustrating a portion in the vicinity of the platen PTN, and illustrating a mechanism for abutting the sheet-shape ink absorber against the discharge port of the recording head according to a third embodiment. The similar elements as those shown in FIGS. 4 and 6 are given the same reference numerals, and their descriptions are omitted.

In this drawing, symbol BND represents a coupling member for integrating the recording head IJH and its discharge port IJO and the platen PTN which restricts the recording surface which opposes the recording head IJH and its discharge port IJO at a predetermined distance by screws SCPH and SCRP. It serves as the component element of the link mechanism similarly to the beam member BEAM1 according to the first embodiment and the recording head IJH according to the second embodiment, and is driven in the direction designated by an arrow in the drawing by a cam to be described later.

Symbol CAM represents a cam. A partial portion of the beam member BEAM3 is abutted to the surface of this CAM by the urging force of a tension spring SPT. The surface of the CAM is displaced in accordance with the rotation of the motor RVM transmitted through pulleys PRE1 and PRE2 and a belt RBT so that the link mechanism is driven.

The discharge recovery treatment action with the above-described structure will be described. The difference from the treatment conducted with the structure shown in FIG. 5 lies in that the following operation is conducted as an alternative to driving the solenoid (steps S510 and S511).

That is, when the conveyance of the cleaning paper CP is stopped simultaneously with the stoppage of the pump, the motor RVM is rotated by a predetermined degree so the that CAM is driven. As a result of this, the CAM first disposed at the position shown in FIG. 7 lowers its surface in accordance with the rotation of the motor RVM so that a unit comprising the platen PTN and the recording head IJH which are integrated by the coupling member BND is displaced downwards in the direction designated by an arrow in this drawing. As a result of this, the discharge port IJO at the lower end portion of the recording head IJH is abutted against the cleaning paper CP sandwiched by the paper exhausting roller POR and the idler PR2 and the paper supplying roller PSR and the idler PR1.

On the other hand, if a stepping motor is used to drive the paper exhausting roller POR and the paper supplying roller PSR, a braking force is applied to the paper exhausting roller POR and the paper supplying roller PSR due to the exciting torque generated when the stepping motor is stopped. Therefore, a fact that the roller is rotated by the abutment of the recording head IJH against the cleaning paper, causing reduction in the tension of the cleaning paper can be prevented. Consequently a proper abutting force can be obtained. Furthermore, since the platen is not also used as a backing as shown in the above-described two embodiments, a fact that an excessive force is applied to the recording head IJH can be prevented.

Furthermore, according to this embodiment, since the recording head IJH and the platen PTN are integrated by using the coupling member BND, the distance between the recording head IJH and the platen PTN, this distance being required to be relatively precise and accurate, can be significantly easily controlled with respect to the above-described two embodiments.

Embodiment 4

Figure 8:
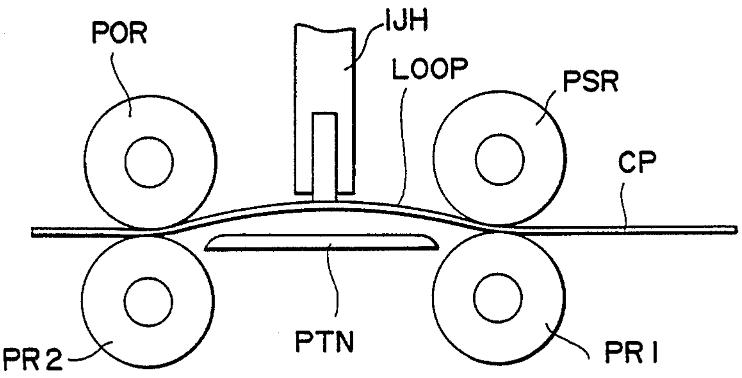
FIG. 8 is a view illustrating the embodiment of the present invention forming a loop as the cleaning medium in the recording region.

FIG. 8 illustrates a fourth embodiment according to the present invention, in which a sheet-shaped ink absorber is abutted against the discharge orifice of the recording head.

As can be clearly seen from this drawing, only the recording paper conveying system is provided as the component element, but the mechanism for driving the platen PTN and the recording head IJH, which are employed in the above-described three embodiments, is not present. In general, the paper exhausting roller POR and the paper supplying roller paper are rotated at the same speed so as to convey the paper preventing float of the recording medium from the platen PTN According to this embodiment, when the cleaning paper CP is conveyed, the rotation of the paper exhausting roller POR is stopped, but only the paper supplying roller PSR is rotated so as to form a LOOP in the cleaning paper CP so as to make the thus-formed LOOP abut against the discharge orifice IJO of the recording head IJH. According to this method, the mechanism for giving the platen and the recording head displacement as described in the above-described three embodiments does not need to be provided to make the cleaning paper CP abut against the discharge orifice of the recording head.

Embodiment 5

As the method of stopping the rotation of the paper exhausting roller POR and also rotation only the paper supplying roller PSR, there is a method in which the paper exhausting roller POR and the paper supplying roller PSR are individually driven by individually provided motors. Another method can be considered in which a power transmission intermitter such as electromagnetic clutch is provided. However, both of them need to be complicated on the viewpoints of control and/or mechanism.

Therefore, a method capable of performing the above-described drive described in FIG. 8 will be described with reference to FIGS. 9A to 9C, this method being additionally provided with slight elements for the conventional mechanism.

Figure 9A:
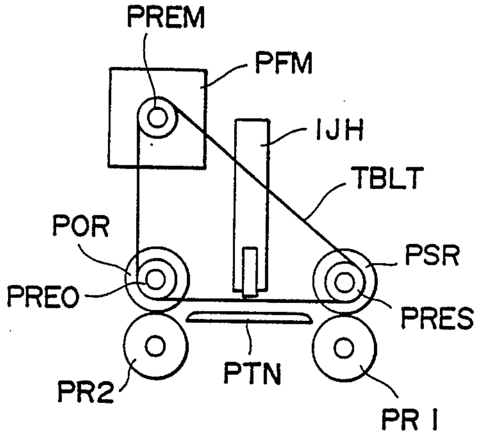
FIGS. 9A–9C are views illustrating another embodiment of the present invention in which the mechanism shown in FIG. 8 is changed.

FIG. 9A illustrates a conventional paper supplying system. The thus-illustrated system is a system in which a pulley PREO secured to the paper exhausting roller POR and a pulley PRES secured to the paper supplying roller PSR are driven by a motor PFM through the same belt TBLT. A structure shown in FIG. 9B formed by novel elements shown in FIG. 9A is added to the mechanism shown in FIG. 9A.

Figure 9B:
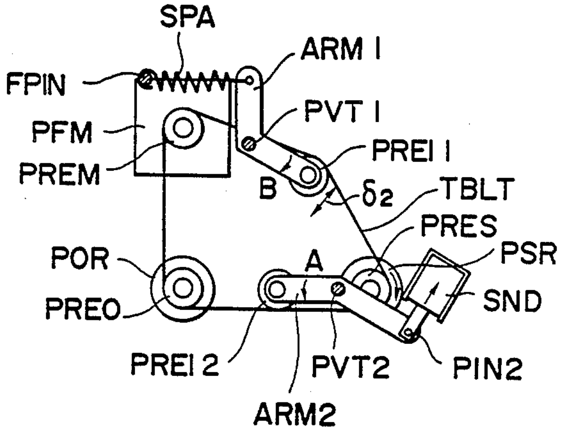
Figure 9C:
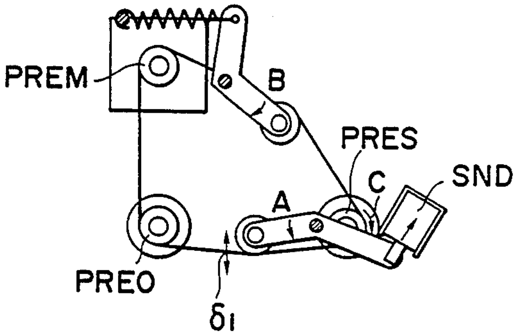

Referring to FIG. 9B, a belt TBLT1 is a belt which is longer than the belt TBLT shown in FIG. 9A by length $\Delta L$. The deflection caused by this length $\Delta L$ is absorbed by an idler pulley PREI1 That is, the idler pulley PREI1 is rotatably secured to an end of an ARM1 which is rotatably provided relative to a pivot PVT1. Therefore, the pulley PRE1 absorbs the deflection generated in the belt TBLT1 as a result of the abutment of the same to the belt TBLT1. Furthermore, an idler pulley PREI2 which is abutted against the belt TBLT1 between the paper exhausting roller POR and the paper supplying roller PSR is rotatably secured to an end of an ARM 2 which is rotatable secured relative to a pivot PVT2, while the other end of the arm ARM2 is connected to the plunger of the solenoid SND with a plunger pin PIN2.

In the above-described structure, when the stepping motor PFM is stopped and the solenoid SND is simultaneously driven in the direction designated by an arrow in this drawing, the idler pulley PREI2 is displaced in the direction designated by an arrow A in this drawing. As a result of this, a novel deflection $\delta_1$ is generated between the pulley PREO and the pulley PRES as shown in FIG. 9C. The generation of this deflection $\delta_1$ causes for the idler PREI1 to be displaced in the direction designated by an arrow B in this drawing, that is the reduction of deflection $\delta_2$ between the pulley PRES and the pulley PREM.

The generation of the deflection $\delta_1$ specifically indicates a fact that the belt is introduced between the pulley PREO and the pulley PRES by length $\Delta l_1$. Since the pulley PREM and the pulley PREO are not rotated due to the braking effected by the exciting torque by the stepping motor PFM, the length $\Delta l_1$ of the belt is fed by the rotation of the pulley PRESS in the direction designated by an arrow C in this drawing. Therefore, the paper supplying roller PSR can be rotated with the paper exhausting roller POR and stopped so that the LOOP can be formed in the cleaning paper CP. The size of the loop formed in the cleaning paper CP is substantial in proportion to the deflection $\delta_1$. Therefore, the size of the loop can be controlled by, for example, a voltage for driving the solenoid SND.

In the above-described embodiments, the action of moving the cleaning paper against the discharge orifice IJO is conducted once in one discharge recovery treatment operation. However, the application of the present invention is not limited to this described. The movement of the cleaning paper CP and abutting against the discharge orifice IJO may be performed alternately several times.

In the above-described embodiments, when the cleaning paper CP is abutted against the discharge orifice IJO, conveyance of the cleaning paper is stopped. However, the application of the present invention is not limited to this description. A control may be employed in which the cleaning paper CP slides along the discharge orifice IJO so as to remove ink droplets or dust.

In the above-described embodiments, a control method is described in which the cleaning paper CP is abutted against the discharge orifice IJO after ink has been removed from the discharge orifice IJO by using a pump or the like. However, a control may be employed in which any mean for forcedly flowing the ink from the discharge orifice IJO is not used, but only action of abutting the cleaning paper CP against the discharge orifice IJO is performed.

Embodiment 6

Figure 10:
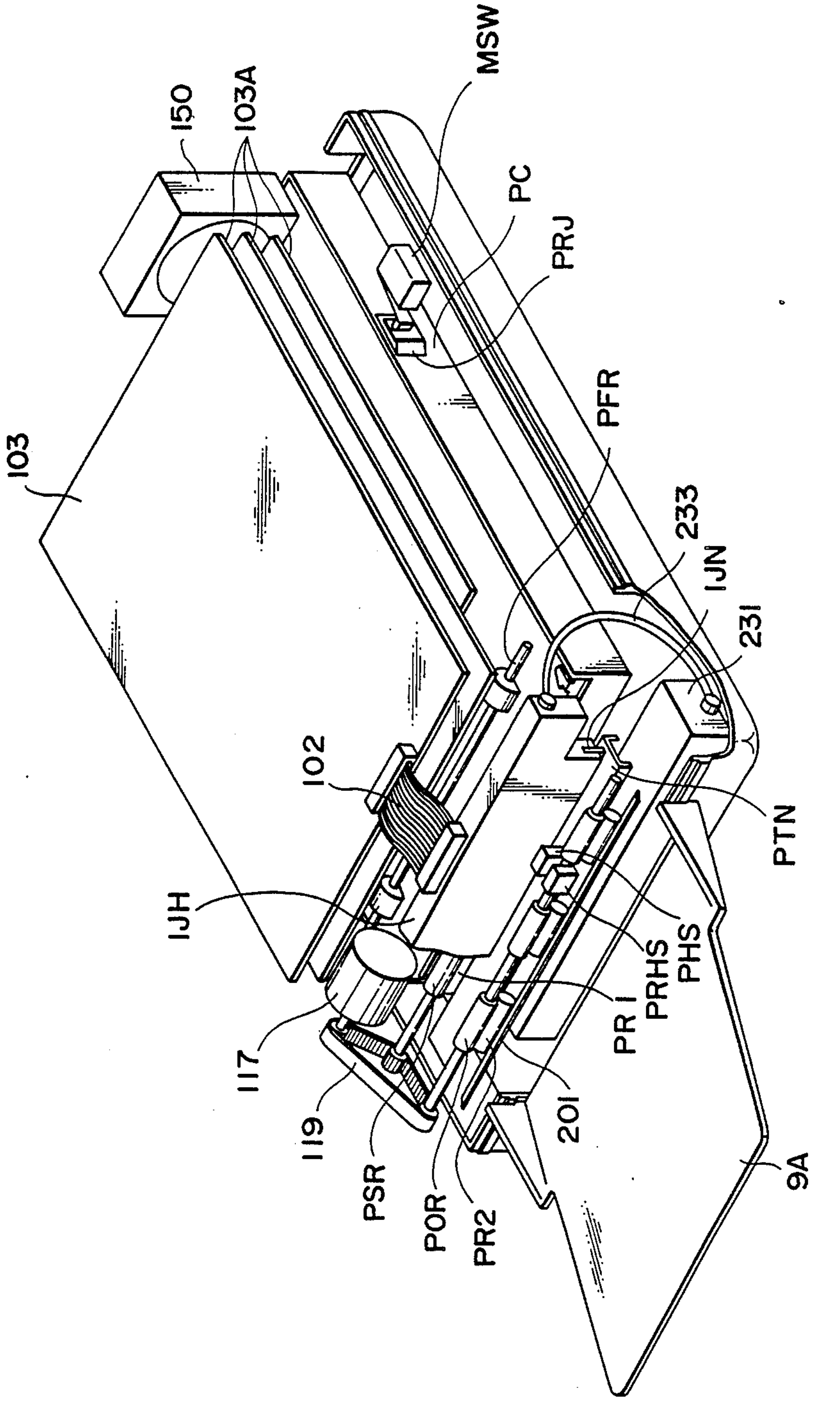
FIG. 10 is a view illustrating another inner structure of the present invention.

FIG. 10 illustrates an example of the internal structure of the device shown in FIG. 1, but is different from that shown in FIG. 2. It is a schematic perspective view illustrating a state, similarly to that shown in FIG. 2, the cover 5 of the apparatus is removed. Referring to this drawing, the ink jet recording head IJH, discharge orifice IJO, a driving element such as electrical mechanical transducing element (omitted from illustration) or an electrothermal transducing element (omitted from illustration), hose device H, the flexible cable 102, the electric circuit portion 103, the paper supplying roller PFR, the paper exhausting rollers PSR and POR, the paper guide 201, the platen PTN, the paper cassette PC, the cleaning paper cassette CPC, the ink chamber 237, the photosensors PHS and PRHS and the microswitch MSW are the same as that shown in FIG. 2.

Figure 11:
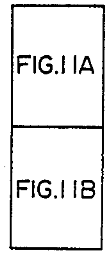
FIGS. 11 to 13 are flow charts according to the other embodiment of the present invention.
Figure 11A:
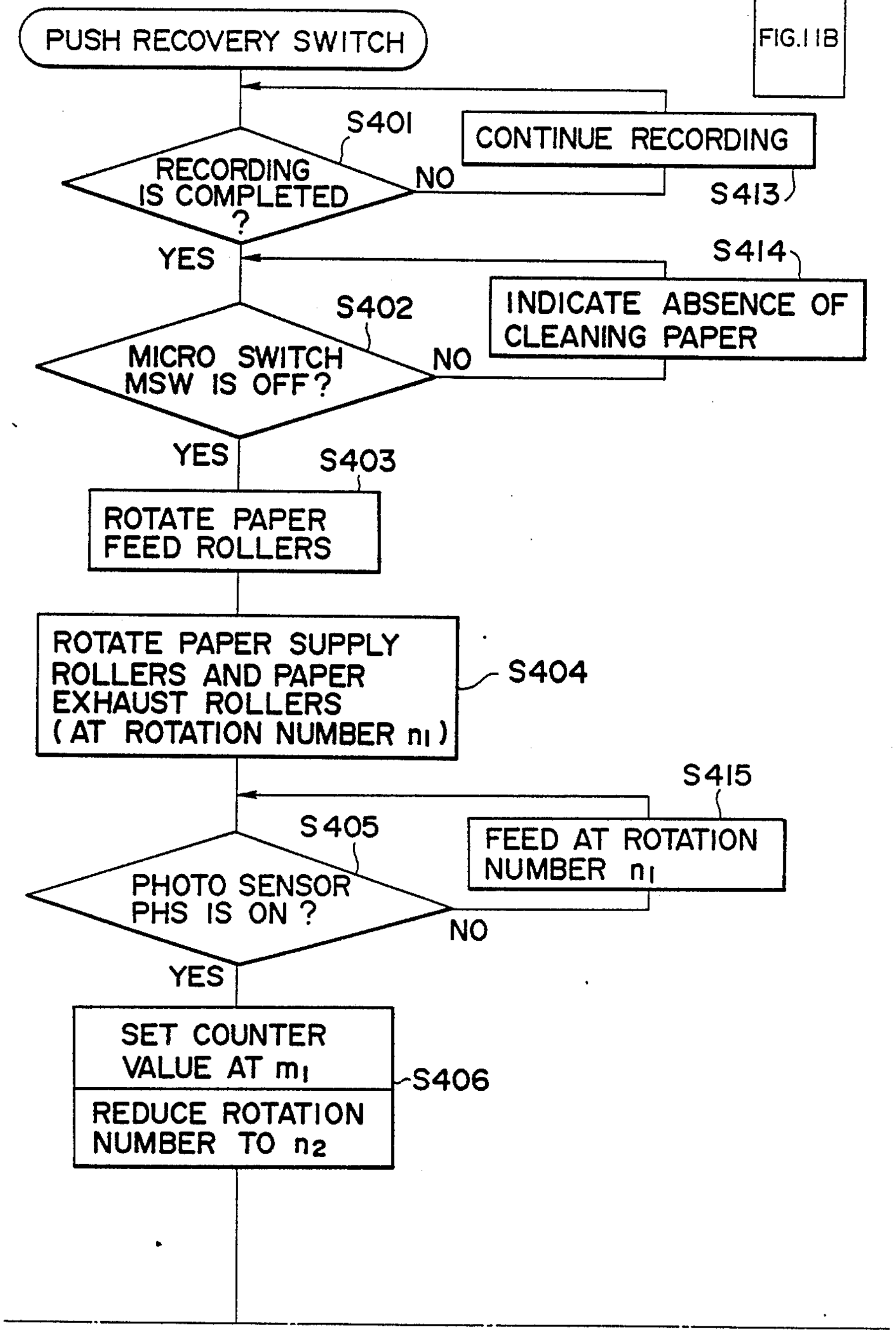
Figure 11B:
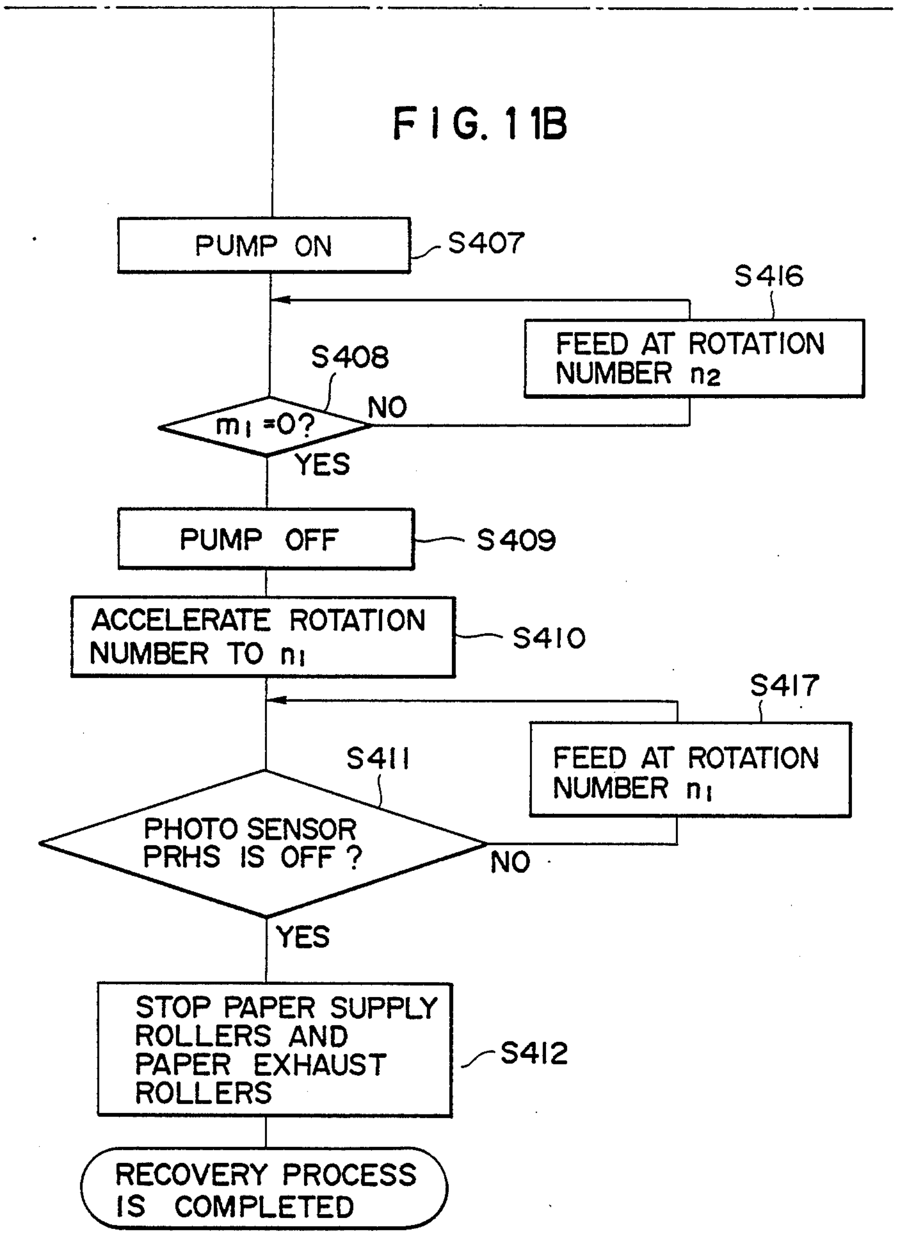

The operative procedure of the discharge recovery treatment performed with the above-described structure will be described with reference to a flow chart shown in FIG. 11.

If non-discharge is generated in the recording head IJH due to increase in ink or the like, user pushes the discharge recovery switch disposed in the operation portion 7. As a result of this, the operation of the discharge recovery treatment starts. During the recording performed by the apparatus, it needs to wait for completion of the recording (steps S401 and S413). In accordance with the state of the microswitch MSW, it is judged whether the paper cassette PC is inserted or the cleaning paper cassette is inserted (step S402) When the switch MSW is turned on, that is when the paper cassette PC is inserted, a display lamp disposed in the operation portion 7 and indicating a fact that the cleaning paper cassette CPC is not inserted is turned on and off (step S414). This causes a user to replace the paper cassette PC with the cleaning paper cassette CPC. In this state, as an alternative to the display lamp, voice or the like may be employed to inform the fact that the cleaning paper cassette CPC is not inserted.

When the fact that the cleaning paper cassette CPC is inserted is confirmed, the paper supplying roller PFR is, similarly to the case where the recording medium is supplied, rotated (step S403) so that the uppermost one of the cleaning paper CP stacked in the cassette is separated and is fed to the paper supplying roller PSR. The paper supplying roller PSR rotates at a relatively fast rotational speed $n_1$ (step S404) which cannot disturb the supply of the cleaning paper CP. As a result of this, the cleaning paper CP is fed in the direction toward the paper exhausting tray 9A (step S415). Then, the front end of the cleaning paper CP passes in the lower portion of the recording head IJH, and it reaches below the photosensor PHS so that this photosensor PHS is brought to a turned-on state. In this state, the photosensor PHS serves as a means for confirming a fact that the front end of the cleaning paper CP has completely passed in the lower portion of the recording head IJH.

When the photosensor PHS is turned on (step S405), a controller (omitted from illustration) simultaneously performs the following three actions. That is, (i) the counter value $m_1$ (this counter value is a value which decreased in proportion to the amount of the feeding of the cleaning paper CP) equivalent to a predetermined amount of paper feed is set in a counter for controlling the amount of the paper feed (step S406).

(ii) the rotational speed of the paper supplying roller PSR and the paper exhausting roller POR is reduced from $n_1$ to $n_2$ (step S406).

(iii) the pump for supplying ink from the ink chamber 231 to the recording head IJH is started and the ink whose viscosity has been increased and the air bubbles in the vicinity of the discharge port are forcedly flowed from the discharge port (step S407). The action shown in (ii) is performed for the purpose of changing the speed of the cleaning paper CP so as to correspond to the ink absorbing performance by the cleaning paper CP, and thereby making the cleaning paper CP absorb the flowed ink by the action shown in (iii). In this embodiment, since the cleaning paper CP has the sufficient ink absorbing performance, the speed reduction is performed. However, even if the absorbing performance of the cleaning paper is not insufficient or the the flow rate of the waste ink is too high since the pressure of the pump is high, the cleaning paper CP may be conveyed at a high rotating number from the initial stage. As a result of this, the leakage of the waste ink from the cleaning paper CP causing contamination of the other than the paper CP can be prevented.

The distance through which the cleaning paper CP at the rotating number $n_2$ is previously defined by the counter value $m_1$, so that the pump operates while the cleaning paper CP is fed through this distance. Therefore, when the waste ink is flowed from the discharge port by the pressure of the pump, the cleaning paper CP is conveyed (step S416) by the paper supplying roller PSR and the paper exhausting roller POR which are rotated at a relatively slow rotating number $n_2$. When the counter value $m_1$ becomes $m_1=0$ (step S408) and the pump is stopped (step S409), the paper supplying roller PSR and the paper exhausting roller POR are again rotated at the rotating number $n_1$ (step S410). As a result of this, the cleaning paper CP is fed to the paper exhaust tray 9A (step S417).

The distance, through which the cleaning paper CP to be fed and defined by the counter value $m_1$, corresponds to, as can be clearly understood from the above description, corresponds to the region which has absorbed the waste ink. The counter value $m_1$ is set to the level that allows for a residual marginal region after the region in which the waste ink has been absorbed in this cleaning paper CP. When the region in which the waste ink has been absorbed is exhausted, the waste ink once absorbed by the cleaning paper CP is adhered to the paper exhausting roller POR. However, the thus-provided marginal portion can absorb the waste ink adhered to this roller POR so that the surface of the paper exhausting roller POR is cleaned. Therefore, it is preferable to set the $m_1$ and the length of the cleaning paper CP in such a manner that at least the length of the marginal portion corresponding to the outer circumference of the paper exhausting roller POR can be remained.

When the rear end of the cleaning paper CP conveyed by the paper exhausting roller POR rotated at the rotating number of $n_1$ separates from the paper exhausting roller POR and passes through the photosensor PRHS, this photosensor PRHS is changed in its state from turned-on state to the turned-off state (step S411). Therefore, the controller judges that the cleaning paper CP has been discharged from the discharge port 9 so that it stops the rotation of the paper supplying roller PSR and the paper exhausting roller POR (step S412). In this state, the recovery treatment is completed.

According to the above-described embodiment, non-discharge recovery treatment in which ink adjacent to the discharge port can be easily forcibly discharged without any necessity of major change of the conventional paper conveyance system can be performed. Furthermore, since the control is so constituted that the cleaning paper CP to be discharged is provided with the marginal portion, the paper conveyance system can be always kept clean since the surface of the roller is cleaned when the marginal portion passes through even if ink is adhered to the paper exhausting roller POR when the region of the cleaning paper CP in which the waste ink has been absorbed is conveyed.

Embodiment 7

Figure 14:
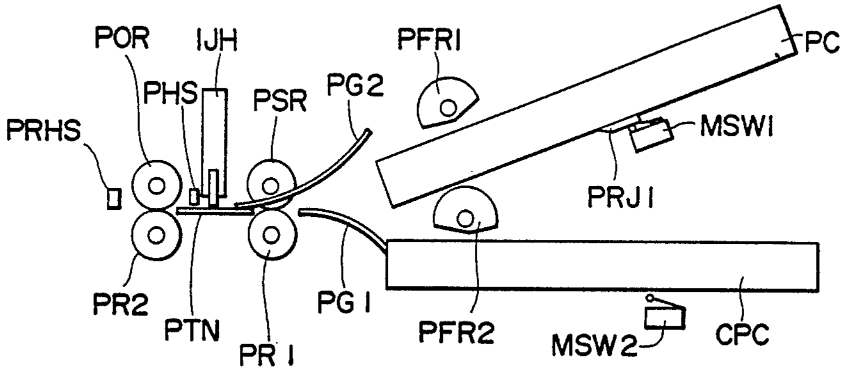
FIG. 14 is a view illustrating an essential portion of the embodiment in which the recording paper cassette and a cleaning paper cassette are provided.

FIG. 14 illustrates other embodiment of the present invention in which the present invention is applied to an apparatus into which two cassettes can be inserted, although, in the above-described embodiments, the apparatus comprises only one cassette insertion portion. The elements similar to those shown in FIG. 2 are given the same reference numerals, and the descriptions for them are omitted. A projection PRJ1 of the cassette for the recording paper is provided on the buttom of the cassette in this embodiment.

Referring to this drawing, symbol CPC represents a cleaning paper cassette which accommodates the cleaning paper CP. This drawing shows a state where a lower stage of the two insertion ports, into which paper cassettes of different sized paper such as A3 size and A4 size can be inserted, is loaded with the cassette CPC. In the thus-structured apparatus, of course, there is, general, any different in the structure of the cassette insertion ports. Therefore, the cleaning paper cassette CPC can be inserted into the upper stage of the same. A fact that the cleaning paper cassette CPC has been inserted into either of the stages is judged in accordance with the signal from the microswitch MSW1 or MSW2. As a result of such structure constituted, the completely similar treatment to that can be conducted in the above-described embodiments can be conducted only by pushing the recovery treatment button without any necessity of replacing the paper cassette PC and the cleaning paper cassette CPC at every discharge recovery operation.

In the embodiment shown in FIG. 14, although the paper cassette PC and the cleaning paper cassette CPC are made the same shape as each other except the projection PRJ, the present invention is not limited to this description. It may, of course, be structured in such a manner that the cleaning paper CP is accommodated in, for example, an exclusive disposal cassette so as to be inserted into a port through which the cleaning paper cassette is inserted exclusively.

Furthermore, as an alternative to supplying the cleaning paper CP from the cassette, it may be one by one supplied to the paper feeding path. With this structure, the completely same effect as that obtained by the above-described embodiments can be obtained.

The structure for manual paper supplying may be structured as conventional. For example, the structure in which a manual paper supplying portion is formed using the upper cover of the cassette or another structure in which a manual paper supplying tray is provided at the other portion of the recording paper cassette may be employed.

Anyway, the necessity for the present invention is to bringing the cleaning paper, to be conveyed, into contact with the recording head while bringing the recording paper, to be conveyed, into non-contact with the same. As a means for achieving this, means of moving the head, means of moving the platen, and arranging the path for the cleaning paper to be different from that for the recording paper by way of forming a loop or utilizing the displacement of the other guide members are, of course, effective upon the present invention.

Embodiment 8

Figure 12:
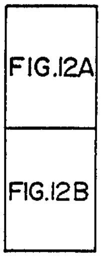
Figure 12A:
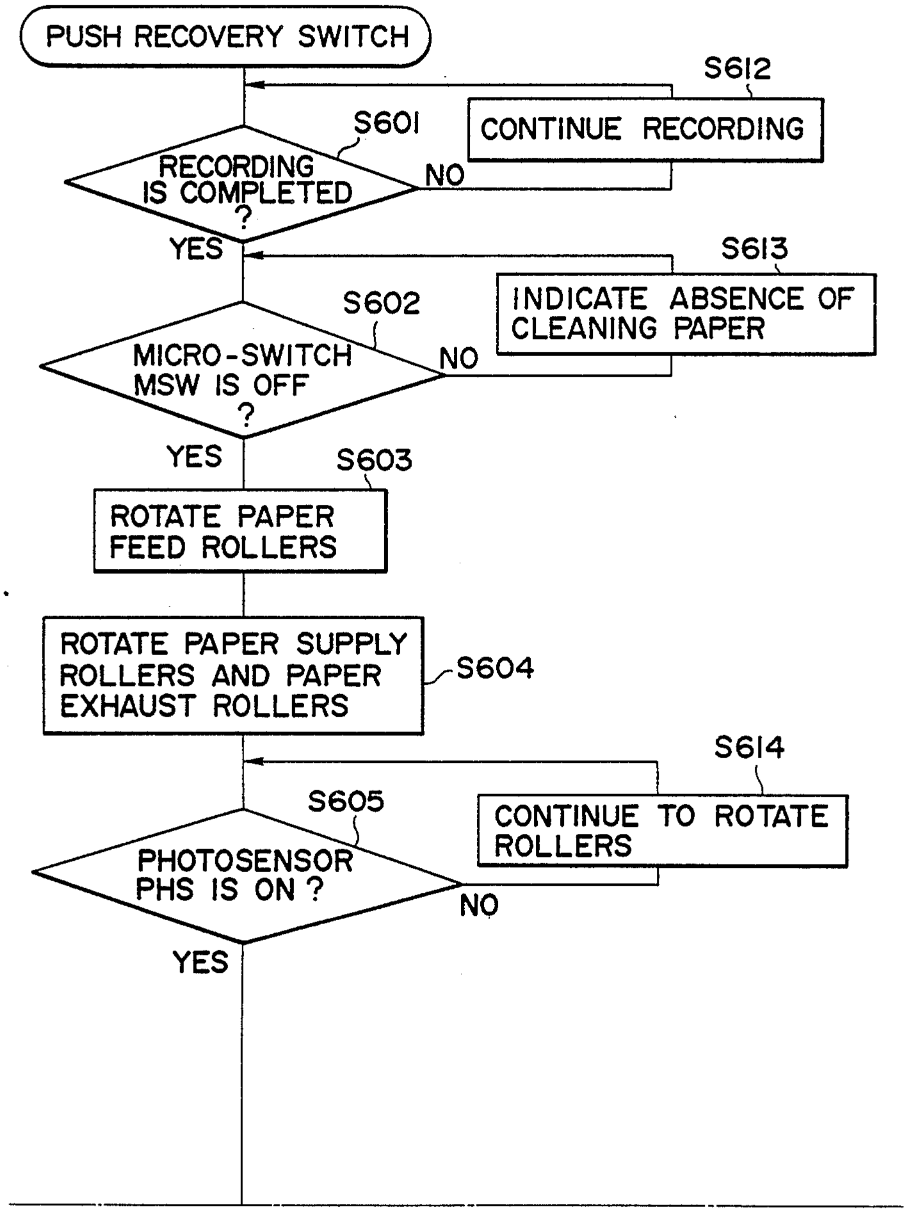
Figure 12B:
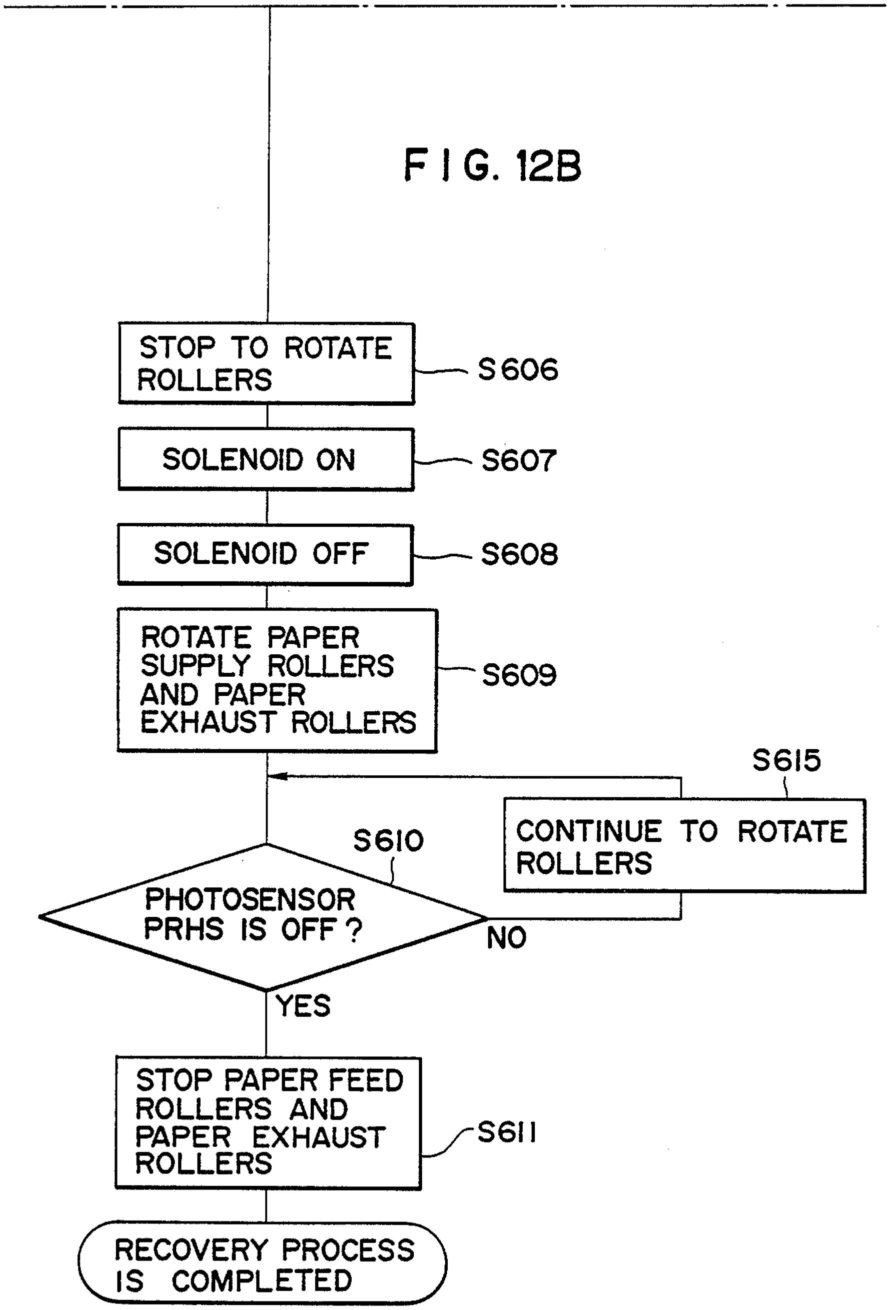

An operative procedure for discharge recovery treatment performed by the other structure will be described by using the schematic cross-sectional view of the device in the vicinity of the platen shown in FIG. 4 with reference to a flow chart shown in FIG. 12.

Figure 5:
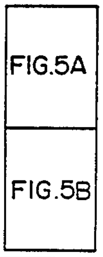
FIG. 5 is a flow chart of an embodiment using the structure shown in FIG. 4.
Figure 5A:
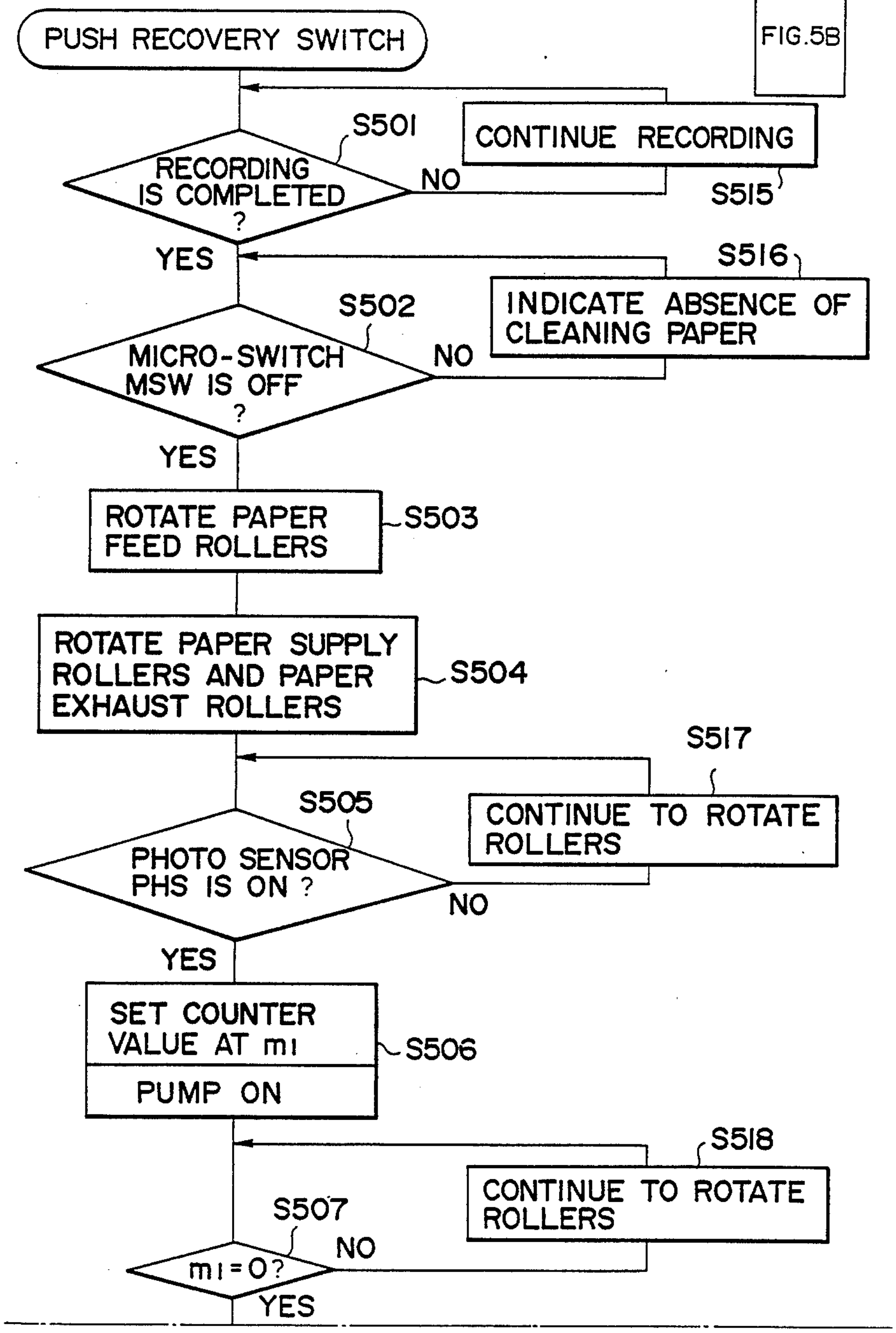
Figure 5B:
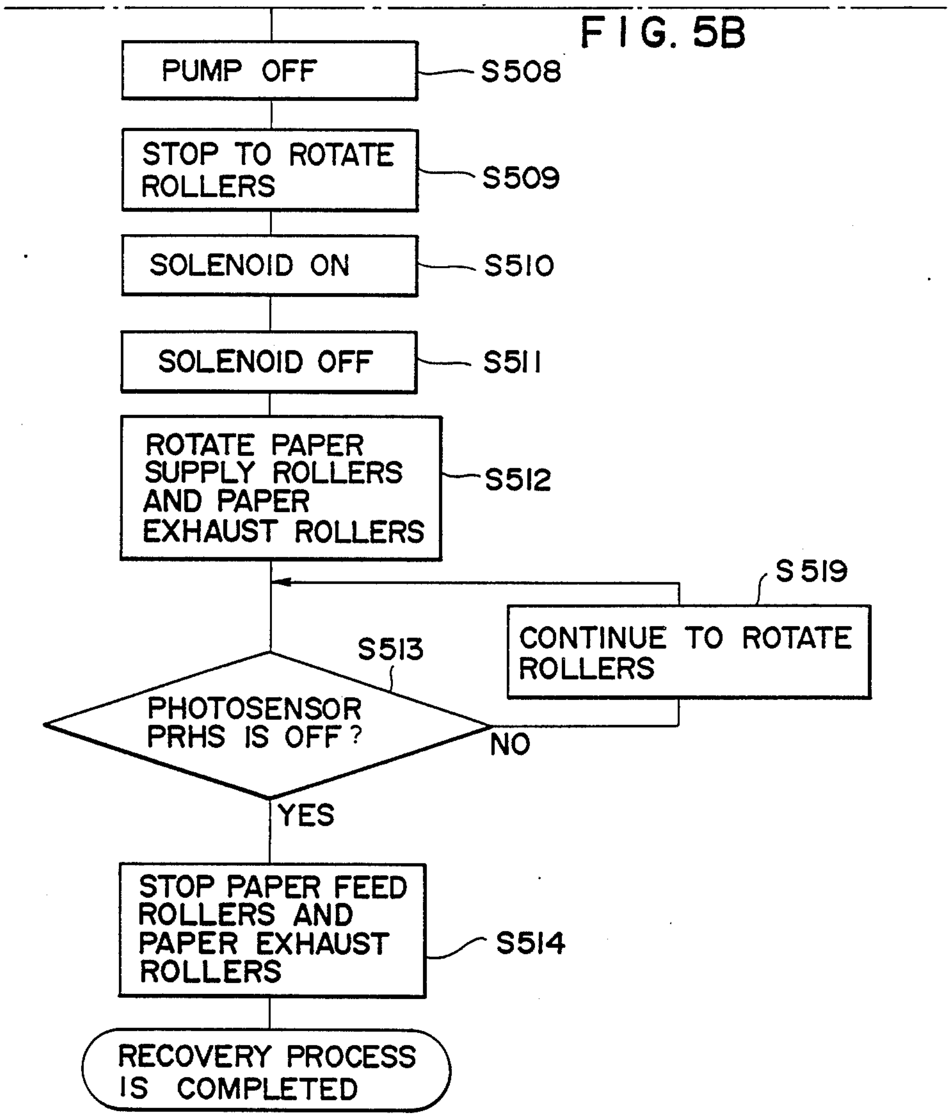

The same portions as those in the treatment procedure shown in steps S501 to S505, and steps S515 to S517 shown in FIG. 5, namely, steps S601 to S605 and steps S612 to S614 are omitted from description.

When the front end of the cleaning paper CP reaches below the photosensor PHS and thereby this photosensor PHS is brought into a turned on state (step S605), the controller (omitted from illustration) stops rotation of the paper supplying roller PSR (step S606). Next, the solenoid SND is operated (step S607), so that the platen PTN is moved in direction designated by an arrow B in FIG. 5 with the link mechanism. As a result of this action, the platen PTN has the cleaning paper CP sandwiched between the recording head IJH and the nozzle IJN. As a result of this, the cleaning paper CP is abutted against the discharge port IJO. The solenoid SND becomes a turned-off state after operating for a predetermined time period (step S608). As a result of this, the cleaning paper CP is separated from the discharge port IJO and is restored to its original state. As a result of abutment of the cleaning paper CP against the discharge port IJO, dust or ink adhered which cannot be removed solely by flowing ink by a pump action can be removed.

The cleaning paper which has been thus-released from abutment is again conveyed by the paper supplying roller PSR and the paper exhausting roller POR (steps S609 and S615). When the rear end of the cleaning paper CP passes the exhaust roller POR and it further passes the photosensor PRHS, this photosensor PRHS is changed in its state from the turned-on state to the turned off state (step S610). As a result of this, the controller (omitted from illustration) judges that the cleaning paper CP has been discharged from the discharge port 9 so that it stops rotation of the paper exhausting roller POR and the paper supplying roller PSR (step S611). In this state, the recovery treatment is completed.

Other embodiments

As the other embodiment of the present invention, a discharge recovery treatment formed by combining the above-described two embodiments is effective.

Figure 13:
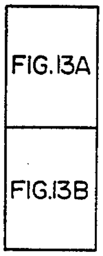
Figure 13A:
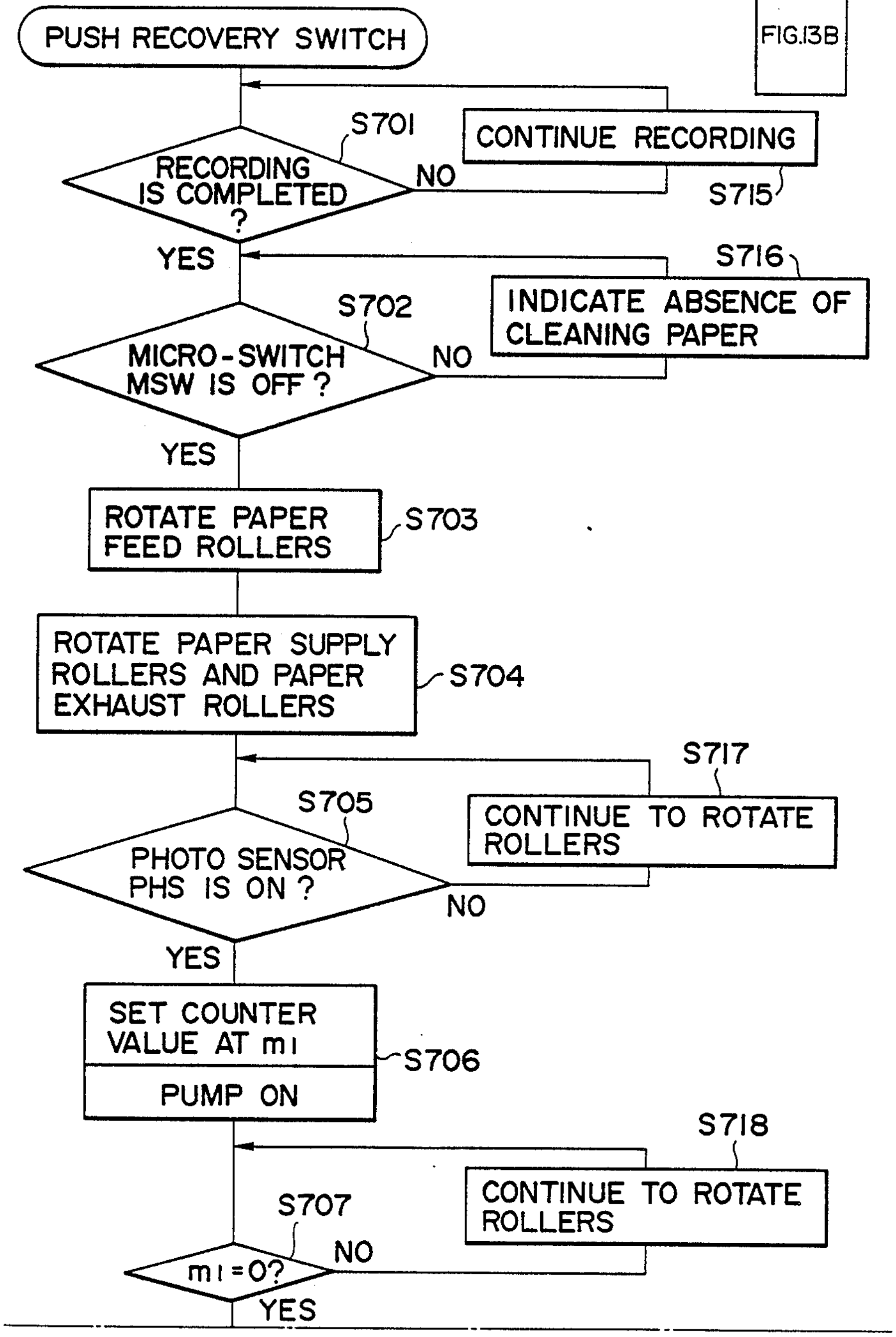
Figure 13B:
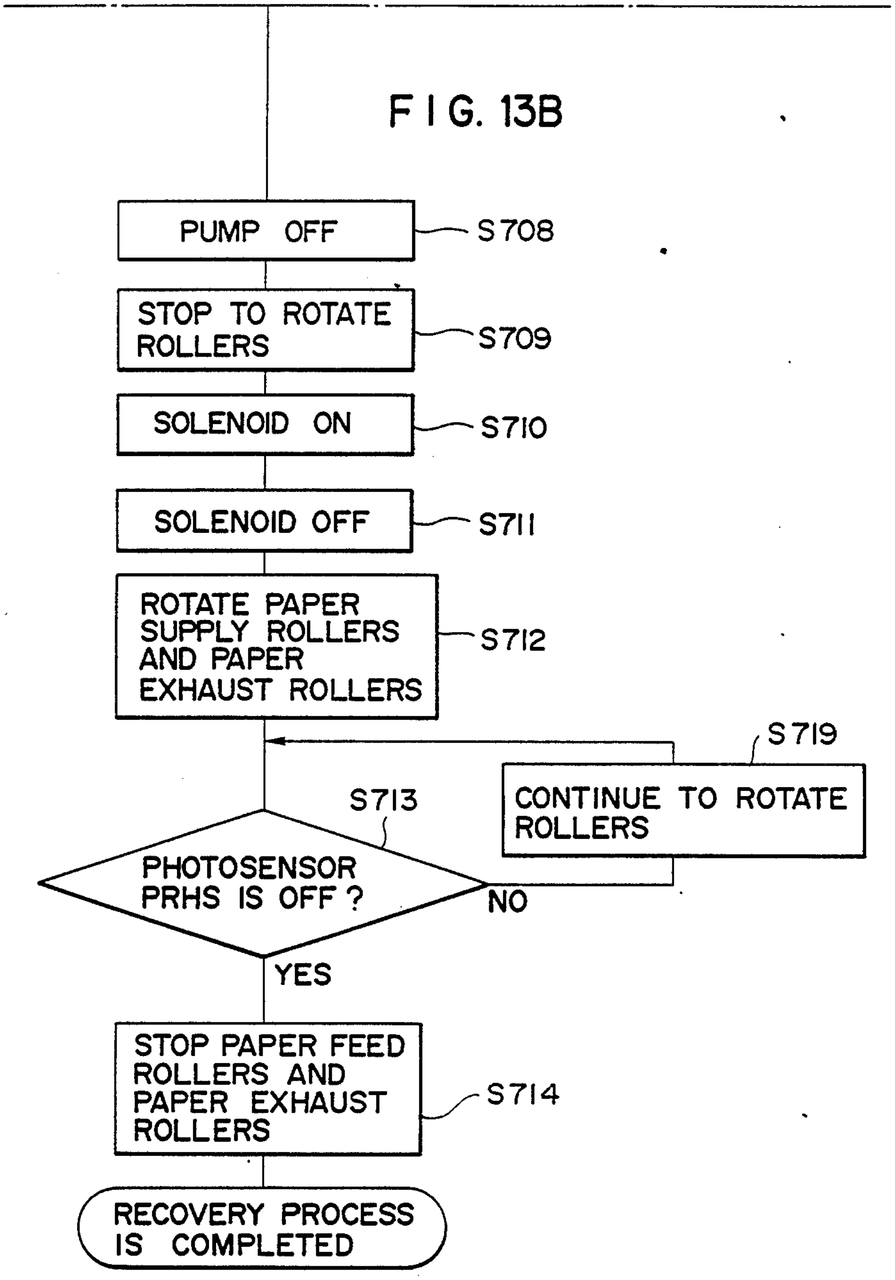

FIG. 13 is a flow chart illustrating an example of the operative procedure of such discharge recovery treatment. The portions which are the same as those in the procedure shown in FIG. 11 or FIG. 12 are omitted from description.

When a fact that the front end portion of the cleaning paper CP has reached the photosensor PHS is confirmed (step S705), a pressurizing means such as pump is operated for a time period during the conveyance of the cleaning paper CP by the amount corresponding to the counter value $m_1$ for the purpose of flowing the ink whose viscosity has been increased or air bubbles, as a result of which, the waste ink is discharged (steps S706 and S718). When the conveyance of the cleaning paper CP is stopped with a predetermined marginal portion remained (steps S707, S708 and S709), the solenoid SND shown in FIG. 4 is operated (step S710) so that the platen PTN is moved in the direction designated by an arrow B with the link mechanism. As a result of this, the cleaning paper CP disposed between the discharge port IJO and the platen PTN is abutted against the discharge port IJO.

According to this embodiment, even if waste ink discharged from the discharge port adheres the end surface of the discharge orifice in the form of an ink droplet, such ink droplet can be removed since the cleaning paper CP is abutted against the discharge port IJO after the waste ink has been flowed.

Although in the second and third embodiments action of abutting the cleaning paper CP against the discharge port IJO is performed once in one recovery operation, a control may be constituted by conducting alternately the movement of the cleaning paper CP and abutment of the same against the discharge port several times.

Furthermore, in the above-described embodiments, although the conveyance of the cleaning paper CP is stopped when the cleaning paper CP is abutted against the discharge port, the present invention is not limited to this description. A control may be employed in which the conveying speed is reduced and the cleaning paper CP slides along the discharge port IJO so as to remove ink droplets or dust.

Figure 15:
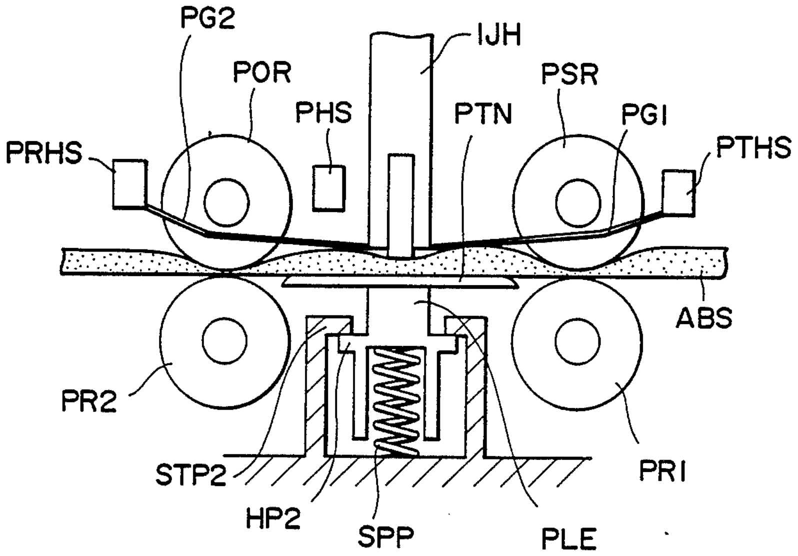
FIG. 15 is a view illustrating an cleaning operation according to a further embodiment of the present invention.

FIG. 15 illustrates an example of the detailed structure of the portion in the vicinity of the platen PTN. In this example, the platen PTN is supported by a platen supporting member PLE containing a butting portion HP2 to be abutted against a stopper STP2 secured to the frame of the main body. The platen supporting member PLE is pushed upward by a platen supporting spring SPP in the upward direction in this drawing so as to press the butting portion HP2 against the stopper STP2 for the purpose of securing the height of the platen PTN. In this embodiment, the interval between the platen PTN and the recording head IJH at the time of performing recording is secured to 1 mm. Symbols PG1 and PG2 represent guides for guiding the recording medium and the absorbing sheet ABS serving as the element related to the major portion of this invention to the position below the discharge port of the recording head IJH. They are disposed substantially symmetrically with respect to the vertical central line of this drawing, that is, they are disposed substantially symmetrically with respect to the recording head IJH in the lower stream of the conveying path and the upper stream of the same. Therefore, they can be structured in such a manner that they can guide the recording guide or the absorbing sheet ABS from any direction as the right (upper stream side, that is the paper supply side on which the paper cassette is present) and the left (lower stream side, that is, the exhaust side on which the paper exhausting tray 9A is present). Symbols PHS, PRHS and PTHS represent photosensors of a, for example, reflection type for detecting a jam in the recording medium or for detecting the position of the absorbing sheet ABS to be conveyed. They are made white or approximate white. That is, when the same confronts a recording medium or an absorbing sheet having a reflectance exceeding a predetermined level, it becomes an turned-on state.

Figure 16A:
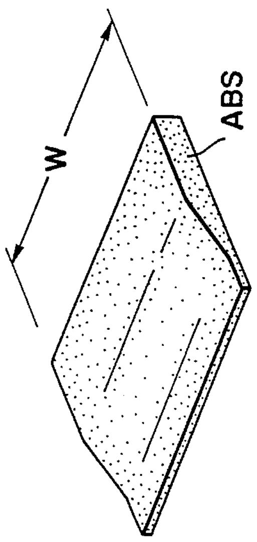
FIGS. 16A and 16B are views illustrating an essential portion of cleaning paper supply and discharge mechanisms applied to the present invention.
Figure 16B:
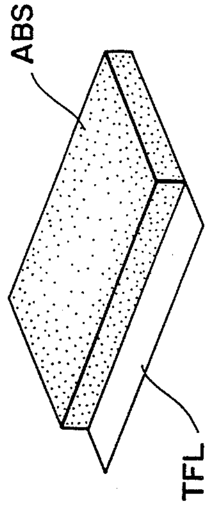

FIGS. 16A and 16B illustrate two examples of absorbing sheets which can be applied to this embodiment. The absorbing sheet shown in FIG. 16A is made of, for example, a polymer absorber (for example, "Beleater" manufactured by Kanebo Ltd.). The width W is made corresponding to the full-multi type of recording head IJH shown in FIGS. 2 or 4. In this embodiment, the thickness of the same is changed along the paper conveyance direction. For example, it is 0.5 mm at the front end portion, while it is 1.2 mm in its relatively thick portion.

On the other hand, in the example shown in FIG. 16B, the structure is constituted in such a manner that a polymer absorber similar to that shown in FIG. 16A is stacked on paper similar to the recording medium or on a thin sheet TFL such as Miler sheet. The front end portion of the same is made in a lead portion LEAD in which the polymer absorber is removed and the thin sheet TFL such as paper appears. In this case, the thickness of the portion in which the polymer absorber is stacked can be made, for example, 1.2 mm, too.

Figure 17:
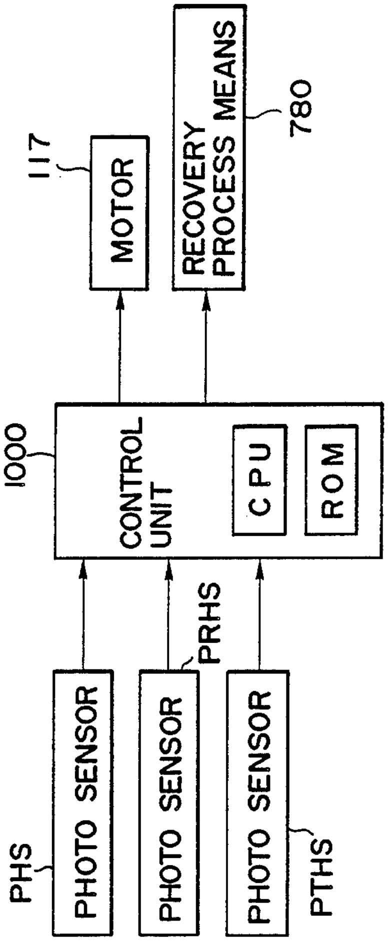
FIG. 17 is a control block diagram according to the embodiment as shown in FIG. 15.

FIG. 17 illustrates an example of the structure of a discharge recovery treatment mechanism according to this embodiment, that is, the control system of each of the portions for performing the discharge recovery treatment according to this embodiment.

Reference numeral 1000 represents a control portion comprising a CUP for controlling each of the portions in accordance with the treatment procedure shown in FIG. 18 to be described later and a ROM storing a program which corresponds to the above treatment procedure. This control portion 1000 may be integrated with the main control portion of the apparatus 1 for controlling each of the portions shown in FIG. 1, 2 or 10.

Reference numeral 780 represents recovery treatment means for performing the recovery treatment by discharging ink from the recording head IJH. It may comprise, for example, a structure having a pump and its driving members, this pump supplies ink with its pressure from the ink chamber 231 to the recording head IJH and presses the inner portion of the same so as to forcedly discharge ink from all of the discharge ports IJO. Alternatively, it may be an element performing recording by driving all of the discharge energy generating elements similar to the conventional recording.

Figure 18:
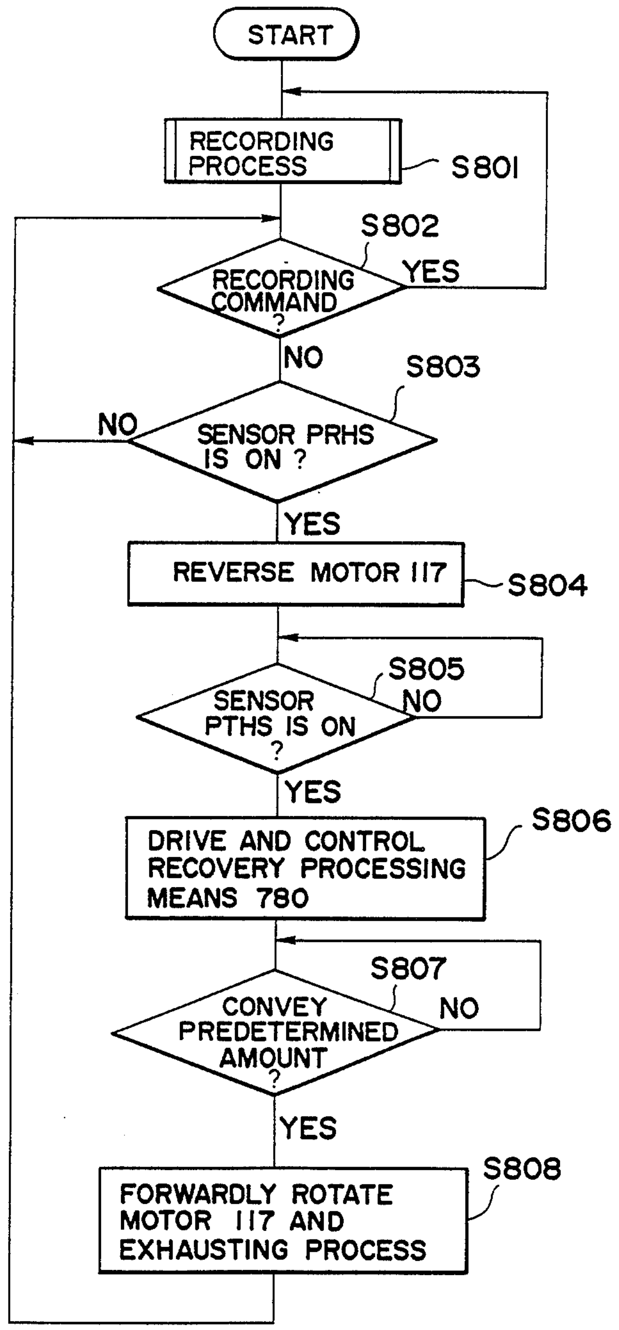
FIG. 18 is a flow chart of the embodiment as shown in FIGS. 15 and 17.

FIG. 18 illustrates an example of a discharge recovery treatment procedure according to this embodiment. The operation of the recovery action will be described with reference to this drawing.

In step S810, when the recording medium is discharged from the discharge port 9 and thus the recording operation is completed, the flow becomes a command-waiting state in steps S802 and S803 after a predetermined time period, for example, substantially two seconds has passed. This state is a state in which all of the photosensors PHS, PRHS and PTHS are turned off and recording instruction (step S802) or a command on recovery treatment is waited. In this state, when a recording command is given in response to the operation of the recording start command switch or the like, the flow shifts to step S801. On the other hand, for example as shown in FIG. 4, when the absorbing sheet ABS is inserted from the paper discharge port 9 with its thin portion made first and its front end portion abuts against the intersection between the paper exhausting roller POR and the idler PR2, the photosensor PRHS is turned on so that the flow is shifted to step S7. That is, in this state, the control portion 1000 judges that the recovery treatment has been required by the operator and it performing the recovery treatment sequence from step S804.

First, in step S804, the motor 117 is started, and the conveying port roller POR and the conveying roller PSR to be rotated in synchronous with the motor 117 are rotated. The direction of rotation of it is made inverse to the direction at the time of recording action. As a result of this, the absorbing sheet ABS inserted from the paper exhausting port 9 is fed to the recording head IJH. Since the thickness of the front end portion of the absorbing sheet ABS is, as described, thin; 0.5 mm, it can be conveyed along the guide PG2 and can be easily made to pass below the discharge port of the recording head IJH. It is then sandwiched by the paper conveying roller PSR and the idler PR1, and it reaches the photosensor PTHS so that this photosensor PTHS is turned on. The control portion 1000 judges that the absorbing sheet ABS is positioned below the discharge port IJO of the recording head IJL depending upon the fact that the photosensors PHS and PTHS are turned on (step S805).

Then, in step S806, the recovery treatment means 780 is driven, and, for example, a pump is started so as to increase the pressure of the ink in the recording head IJH so that air bubbles or ink whose viscosity has been increased is made to flow from the discharge port IJO. The waste ink discharged from the discharge port IJO is instantaneously absorbed by the absorbing sheet ABS. The time for which the recovery treatment means 780 is driven can be optionally determined in accordance with the performance of the pump, the resistance of the ink supplying path and the discharge port, and the viscosity of the ink. In this embodiment, it is set to substantially 0.5 sec to 1 sec.

When the recovery treatment means is stopped and further the absorbing sheet ABS is conveyed, the thick portion (in this embodiment, it is 1.2 mm) of the absorbing sheet ABS reaches below the discharge port IJO of the recording head IJH, and it is brought into contact with the discharge port IJO as shown in FIG. 15. As a result of this, the ink droplets or dust adhered to the end surface adjacent to the discharge port IJO can be removed. In this state, since the platen PTN is supported by the platen supporting spring SPP, it can prevent a fact that an excessively large force is applied to the recording head IJH by deflection of this spring SPP even if an excessively thick sheet or hard sheet has been introduced.

The control portion 1000 judges a fact that the amount of conveyance has reached a predetermined level after the absorbing sheet ABS has passed the photosensor PTHS. It can be conducted, for example, depending upon the time after the affirmation has been made with considering the conveying speed or the like. Or it can be controlled by a control pulse if a pulse motor is employed as the motor 117. After the predetermined amount of conveyance has been completed, the motor 117 is forward rotated in step S808 so that the absorbing sheet ABS is discharged from the apparatus. Thus, the recovery operation is completed, and the flow returns to step S802.

In this embodiment, although a control is formed in such a manner that the waste ink forcedly discharged from the discharge port IJO is absorbed by the absorbing sheet ABS and this absorbing sheet ABS is brought into contact with the discharge port IJO, the non-discharge failure due to the adhesion of the ink droplets or dust to the portion adjacent to the discharge port IJO can be effectively overcome only by treatment when the absorbing sheet ABS is brought into contact with the discharge port IJO if the treatment of absorbing the ink after its discharge.

Furthermore, it is effective to repeat the treatment described in the aforesaid embodiments in such a manner that the conveyance of the absorbing sheet ABS is performed several times in one recovery treatment action as an alternative to the one reciprocation.

Furthermore, in the above-described embodiment, a structure is described in which the absorbing sheet ABS is inserted from the conveyance port 9 of the apparatus and it is exhausted from the exhausting port 9, the present invention is not limited to this description. For example, the structure may be formed in such a manner that the absorbing sheet ABS is stacked and accommodated in the cassette similar to the recording medium, and this absorbing sheet ABS is conveyed from the cassette similarly to the time of recording. Next, it is fed to the position confronting the discharge port IJO of the recording head IJH by using the conveying path of the recording medium. Then the recovery treatment described in the embodiments is performed and this absorbing sheet ABS is discharged from the conveyance port 9.

Figure 19:
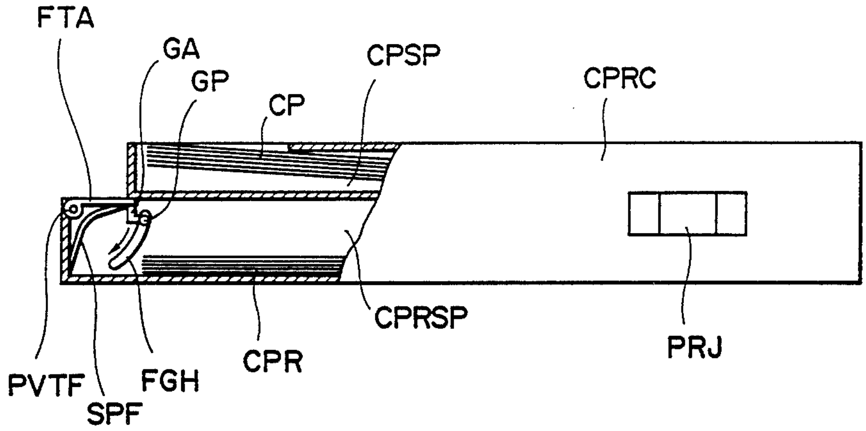
FIG. 19 shows a main part illustrating a supply and exhaust mechanism of cleaning paper utilized for the embodiments according to the present invention.

FIG. 19 is a partial broken cross-sectional view illustrating the detail of the cleaning paper cassette CPRC. The internal structure comprises two layers constituted by a stocking portion CPSP for stocking un-used cleaning paper CP and a used cleaning paper stocking portion CPRSP for accommodating used cleaning paper CPR. An opening OPA (see FIG. 2) through which used cleaning paper CPR is introduced can be opened/closed by a cover FTA. The cover FTA is urged by the urging force of the spring SPF in the direction to close the opening OPA. When the cleaning paper cassette CPRC is mounted on the main body of the apparatus, a guide pin GP projected laterally from a guide arm of the cover FTA and a cover guide FGD provided on the main body of the apparatus are, relating to the operation of this apparatus, engaged with each other in accordance with the insertion operation of this apparatus. As a result of this, the cover FTA is moved downward along a guide groove FGH against the urging force of the leaf spring SPF so that the opening OPA is opened.

Figure 20A:
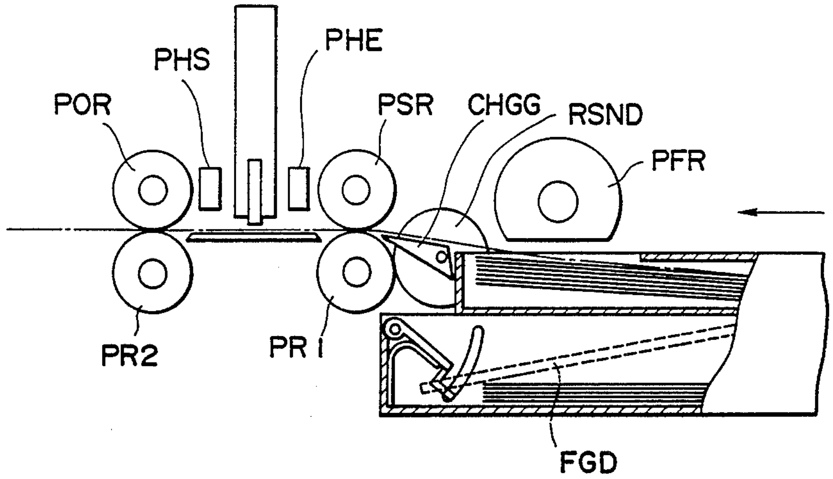
FIGS. 20A and 20B are views illustrating the operation of the structure shown in FIG. 19.
Figure 20B:
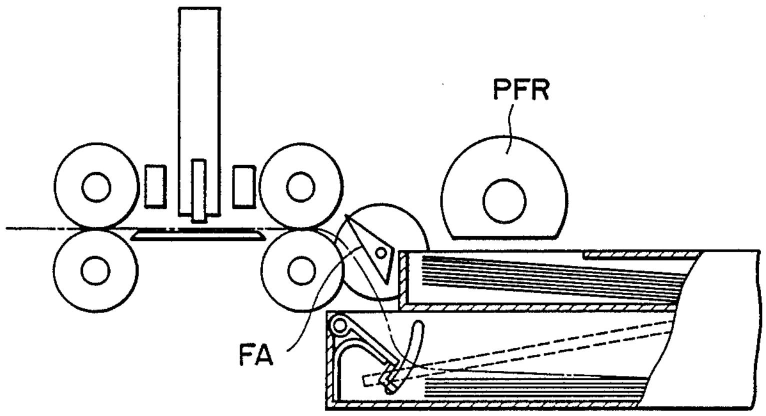

FIG. 20A illustrates a state where the cleaning paper cassette CPRC is mounted on the main body of the apparatus and the cleaning paper CP is drawn out from the cassette CPRC. As shown in this drawing, when the cassette is mounted, the cover FTA is opened by the engagement realized by the cover guide FGD provided for the main body of the apparatus and the guide pin GP in accordance with the insertion action of this mounting in the direction designated by an arrow in this drawing. In FIG. 20A, symbol CHGG represents a paper path changing guide fitted to the shaft of a rotary solenoid RSND. It stops in two states as shown in FIG. 20A and 20B in accordance with the rotation of the rotary solenoid RSND so that different paper paths are formed. Symbol PHE represents an end sensor in the form of a photosensor for detecting the rear end portion of the subject to be conveyed. In particular, it is used for detecting the rear end of the cleaning paper.

Figure 21:
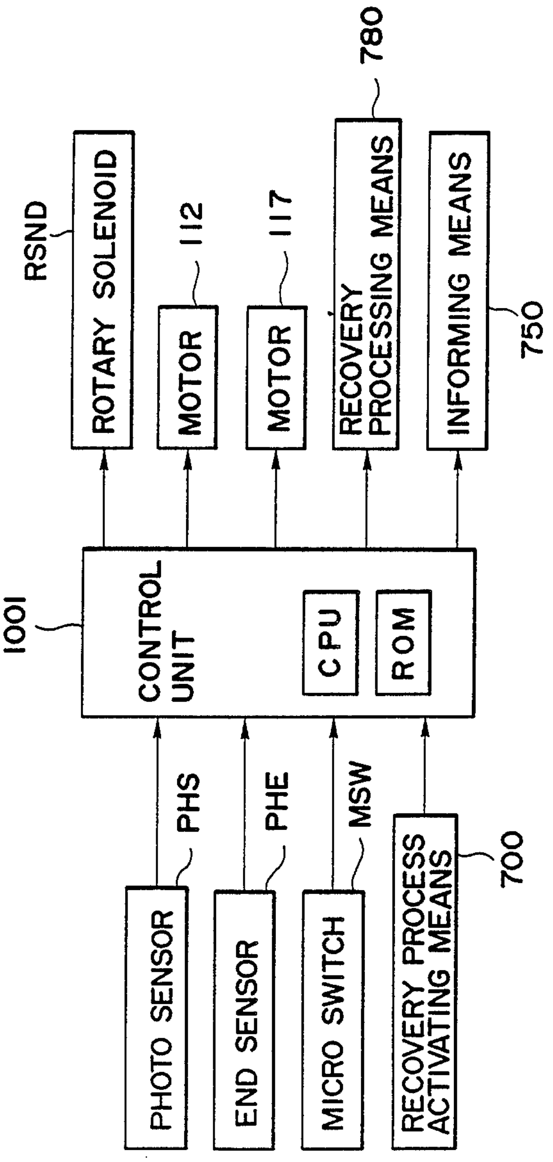
FIG. 21 is a control block diagram according to the other embodiment of the present invention.

FIG. 21 illustrates an example of the structure of the discharge recovery treatment mechanism, that is, the control system of each of the portion related to the discharge treatment according to this embodiment.

In this drawing, reference numeral 1001 represents a control portion comprising a CUP for controlling each of the portion and in accordance with the treatment procedure shown in FIG. 7 to be described later and a ROM for storing the program corresponding to the treatment procedure of it. This control portion 1001 may be integrated with the main control portion of the main body 1 of the apparatus for controlling each of the portions shown in FIGS. 1, 2 and 10.

Reference numeral 700 represents starting means for starting a discharge recovery treatment to be described later with reference to FIG. 22. For example, it may be formed in a switch provided in the operation portion 7. Furthermore, it may be formed in such a manner that the power source of the apparatus is turned on or the same is started every predetermined time.

Reference numeral 750 represents notifying means for urging the operator to replace the paper cassette with the cleaning paper cassette CPRC. For example, it may be formed in a display device provided in the operation portion 7. Furthermore, it may be in the form of a buzzer or the like to inform this.

Reference numeral 112 represents a motor for driving the paper supplying roller PFR. Reference numeral 780 represents recovery treatment means for making the recording head IJH discharge ink so as to perform recovery treatment. For example, it may be formed by a structure comprising a pump and its driving members, this pump conveying ink with its pressure from the ink chamber 231 to the recording head IJH, and it pressurizes the internal portion of the same for the purpose of forcedly discharging ink from all of the discharge ports. Alternatively, a structure may be formed in such a manner that all of the discharge energy generating elements are, similarly to the time of conventional recording, driven.

Figure 22:
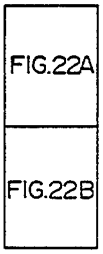
FIG. 22 is a flow chart according to FIG. 21.
Figure 22A:
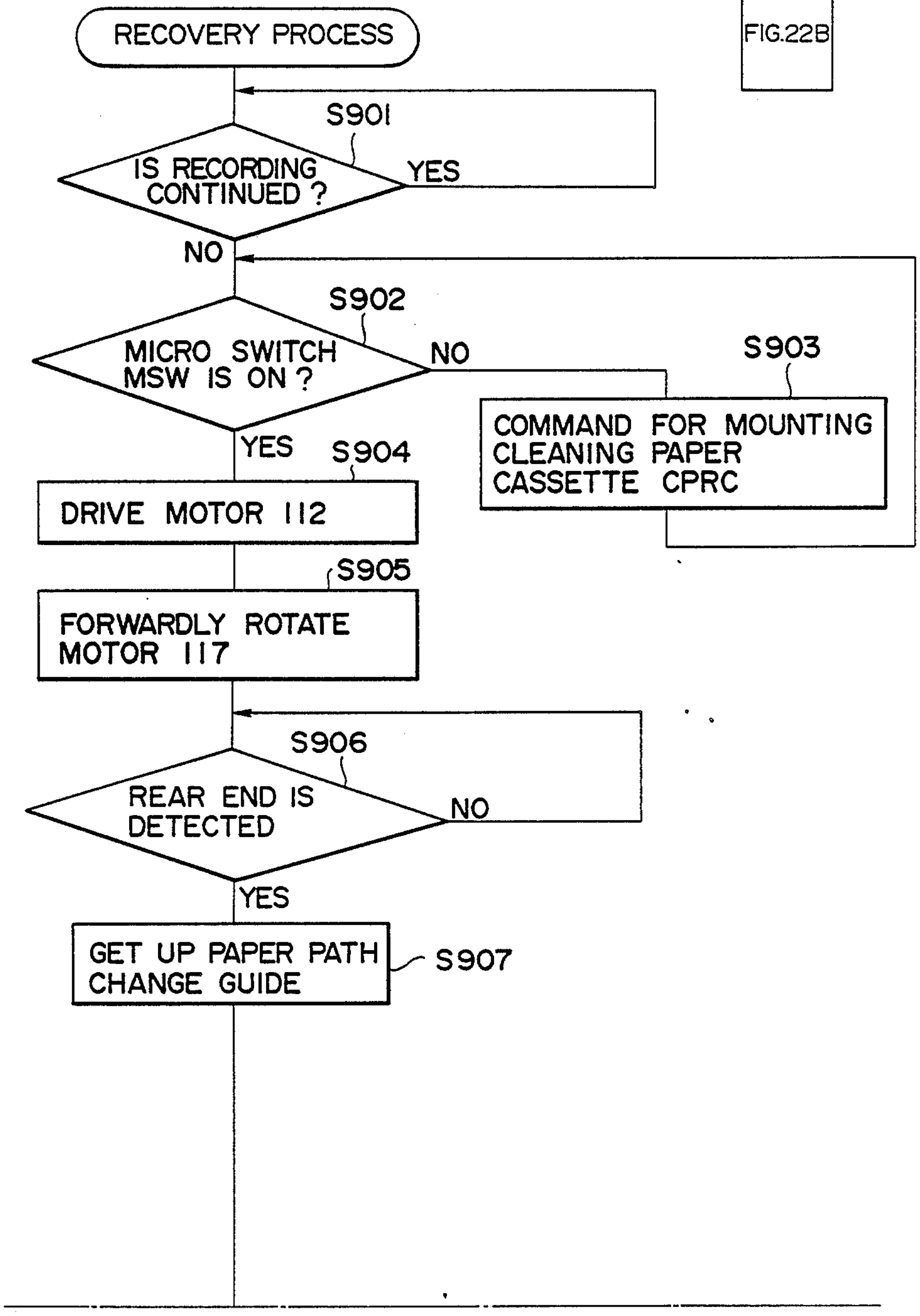
Figure 22B:
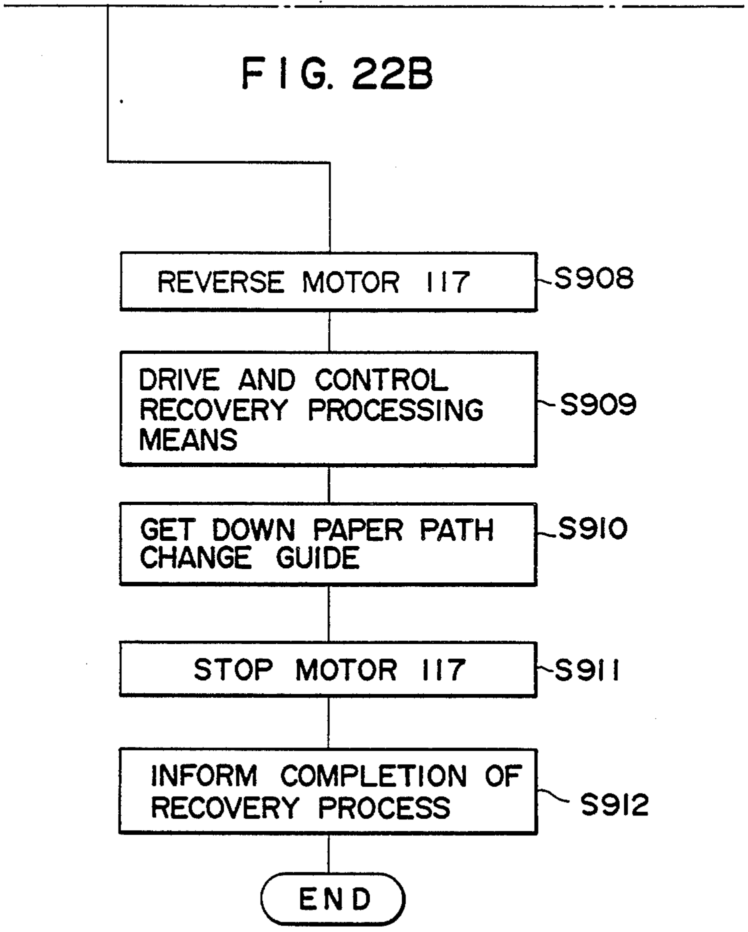

FIG. 22 illustrates an example of the discharge recovery treatment procedure according to this embodiment. The operation of the recovery treatment will be described with reference to this drawing.

For example, if non-discharge of ink is generated in the recording head IJH due to increase in the viscosity of ink or the like, the operator operates the recovery treatment starting means 700 (the recovery switch provided in the operation portion 7. As a result of this, this procedure is started. During recording action performed by the apparatus, completion of this recording is, in step S901, waited. Next, it is judged whether the paper cassette is inserted or the cleaning paper cassette is inserted depending upon the state of the microswitch MSW (step S902). If the switch MSW is turned off, that is the paper cassette is inserted, this fact is notified by the notifying means 750 in step S903. That is, for example, the display device provided in the operation portion 7 is turned on and off so as to notify that the cleaning paper cassette is not inserted. As a result, it is urged for the operator to replace the paper cassette with the cleaning paper cassette.

In step S902, when insertion of the cleaning paper cassette CPRC is confirmed, the motor 112 is, similarly to the case where the recording medium is supplied at the time of usual recording, driven in step S904. As a result of this, the paper supplying roller PFR is rotated once so that the uppermost one of the cleaning paper CP stacked in the cassette CPRC is separated and fed in the conveying roller PSR. Simultaneously the motor 117 is forward rotated in step S905 so that the conveying roller PSR is driven. In this state, the paper path changing guide CHGG is at a position as shown in FIG. 20A.

When the rear end portion of the cleaning paper CP is detected by the end sensor PHE after a certain degree of continuation of conveyance of the cleaning paper CP, the rotary solenoid RSND is, in step S907, driven so that the paper path changing guide CHGG is set to the position shown in FIG. 20B. Next, the rotation of the motor 117 is reversed in step S908 so that the cleaning paper CP is conveyed reversedly. Then, the recovery treatment means 780 is, in step S909, driven, that is, for example, a pump is started so that the pressure of the ink in the recording head IJH is increased. As a result of this, ink whose viscosity has been increased, air bubbles, or dust adjacent to the discharge port IJO is discharged from the discharge port IJO.

By properly controlling the motor 117, the cleaning paper CP can be fed at the speed at which it can sufficiently absorb the flowed ink from the discharge port IJO. Then, the front end portion of it (the rear end portion at the time of forward conveyance) abuts surface FA (see FIG. 20B) of the paper path changing guide CHGG so that the same is introduced to the used cleaning paper storing portion CPRSP via the opening OPA. During this conveyance process, the recovery treatment means 780 is stopped so as to remain a proper marginal portion in the cleaning paper CP. This can be conducted by controlling time considering the rotating number of the motor 117 and the length of the cleaning paper CP, by controlling the rotating number of the motor 117, or by detecting the rear end (the front end at the time of forward rotation conveyance) of the cleaning paper CP. As a result of this, by the conveyance of the cleaning paper CP which has absorbed ink, the surface of the paper supplying roller PSR which can be contaminated by ink can be cleaned by the residual marginal or blank portion in the following conveyance process.

As a result of this, when the used cleaning paper CPR is completely stored by the storing portion CPRSP, the drive of the rotary solenoid RSND is released in step S910 so that the paper path changing guide CHGG is lowered, and is again restored to the position shown in FIG. 20A. Furthermore, the motor 117 is stopped in step S911 so that the rotation of each of the rollers is stopped. In step S912, the notifying means 750 is used, and thus the completion of the discharge recovery treatment is notified. If the replacement treatment is urged in step S5 by turning on and off of the display device in the operation portion 7 and it is turned on during the recovery treatment, the fact of the completion can be notified by turning off the display device.

When the cleaning paper cassette is replaced, after the above-described recovery treatment has been performed, by the paper cassette for preparing for the recording again, the cover FTA of the cleaning cassette CPRC drawn from the apparatus is restored to the position shown in FIG. 19 by the urging force of the leaf spring SPF so that the opening OPA for introducing the used cleaning paper CPR is closed. As a result of this, the operator's finger is prevented from contamination by the used cleaning paper CPR.

As for treatment for the cleaning paper cassette (used cassette) in which the cleaning paper CP accommodated in the storing portion CPSP thereof has been completely used, it may be, of course, used again by user's action of abolishing the used cleaning paper CPR and supplying the cleaning paper CP. It is effective to manufacture the cassette at a low cost so as to make it disposal type or return the used cassette to the dealer when a new cassette is purchased by the user and reproduce the used cassette by the purchaser. With this system, the waste liquid can be prevented from being looked at by the users.

Furthermore, it is also an advantage that the time at which the used cassette needs to be replaced can be made unconscious since the cassette CPRC is structured by integrating the storing portion CPSP for storing the unused cleaning paper and the storing portion CPRSP for storing the used cleaning paper CPR.

In these embodiments, the structure is formed in such a manner that the cassette mounting portion in the main body of the apparatus is made a single type and thereby the paper cassette and the cleaning paper cassette are replaced with each other at the time of recording action/restoring action. However, it is easy to form the structure such that the portion on which the paper cassette is mounted and the portion on which the cleaning paper cassette is mounted are individually provided. In this case, the necessity of replacing the cassette at every recovery treatment becomes needless.

We claim:

1. An ink jet recording apparatus including operational modes, said modes comprising:

a non-contact print mode in which a recording head records an image on a recording medium by selectively discharging ink, said recording medium being conveyed into a recordable region, wherein said recording head is opposed to but not in contact with said recording medium at a predetermined interval; and a contact cleaning mode in which a cleaning sheet, which has been conveyed into said recordable region by using at least a part of a conveyance route for said recording medium, is brought into contact with said recording head to clean said recording head an is then discharged from said recordable region.

2. An ink jet recording apparatus according to claim 1, further comprising a recovery mode for recovering ink discharge by exhausting ink from said recording head to said cleaning sheet, wherein said contact cleaning mode performs contact cleaning with said cleaning sheet after said recovery mode is performed.

3. An ink jet recording apparatus according to claim 2, wherein a contacting area of said cleaning sheet which contacts said recording head is a section which does not receive the exhausted ink.

4. An ink jet recording apparatus according to claim 1, wherein the conveyance routes for said recording medium and said cleaning sheet are different in said non-contact print mode and in said contact cleaning mode.

5. An ink jet recording apparatus according to claim 1, wherein the conveyance routes for said recording medium and said cleaning sheet are the same in said non-contact print mode and in said contact cleaning mode.

6. An ink jet recording apparatus according to claim 1, wherein said recording head is moved in the direction in which said predetermined interval between said recording head and said recording medium is reduced in said contact cleaning mode.

7. An ink jet recording apparatus according to claim 1, further comprising a platen facing said recording head and being provided for the purpose of forming said predetermined interval, said platen being moved in the direction in which said predetermined interval is reduced in said contact cleaning mode.

8. An ink jet recording apparatus according to claim 1, further comprising a conveying mechanism for making said cleaning sheet into a loop-shape within a recordable range and said conveying mechanism is operated during said contact cleaning mode.

9. An ink jet recording apparatus according to claim 8, wherein said conveying mechanism has a stepping motor for driving a sheet conveying rotary member.

10. An ink jet recording apparatus according to claim 1, wherein the thickness of said cleaning sheet is larger than that of said recording medium.

11. An ink jet recording apparatus according to claim 1, wherein said cleaning sheet is accommodated in an exclusive cassette and is capable of being mounted on the main body of said apparatus.

12. An ink jet recording apparatus according to claim 11, wherein said cassette comprises a space for collecting said cleaning sheet which has performed cleaning.

13. An ink jet recording apparatus according to claim 1, wherein during said cleaning mode said cleaning sheet has a section which is not contacted by said recording head downstream of a contacted section of said cleaning sheet with respect to an exhausting direction from said recordable region.

14. An ink jet recording apparatus according to claim 13, wherein the length of said non-contacted section of said cleaning sheet is longer than the periphery of an exhausting rotary member in said exhausting direction.

15. An ink jet recording apparatus according to claim 1, further comprising a mechanism for defining a pressure-contacting state between said cleaning sheet and said recording head during said contact cleaning mode, wherein said defining mechanism has a safety device for preventing said pressure-contacting state from becoming greater than a predetermined pressure.

16. An ink jet recording apparatus according to claim 1, wherein said contact cleaning is performed a plurality of times with said cleaning sheet through movement of said cleaning sheet during said contact cleaning mode.

17. An ink jet recording apparatus according to claim 1, wherein said contact cleaning is performed a plurality of times with said cleaning sheet through movement of said cleaning sheet during said contact cleaning mode while said recording head is stationary.

18. An ink jet recording apparatus according to claim 1, wherein said contact cleaning is performed a plurality of times with said cleaning sheet through movement of said cleaning sheet during said contact cleaning mode and by decelerating conveying means for moving said recording medium and said cleaning sheet.

19. An ink jet recording apparatus according to claim 1, wherein said recording head has an electrothermal converting member for generating thermal energy for discharging ink.

20. An ink jet recording apparatus according to claim 1, wherein said apparatus has a recovery process key for executing said contact cleaning mode.

21. A cleaning sheet for use in a contact cleaning mode in an ink jet recording apparatus comprising:

a leading edge portion to be conveyed and having a thickness smaller than the interval between a platen and a recording head through which interval a recording medium is guided; and a portion for cleaning having a thickness larger than said interval and capable of being elastically deformed.

22. An ink jet recording apparatus using said cleaning sheet according to claim 21 comprises:

means for performing recovery treatment by causing said recording head to discharge ink when said leading edge portion faces said recording head.

23. An ink jet recording apparatus according to claim 21, wherein said recording head cleaned by said cleaning sheet has an electrothermal converting member for generating thermal energy for discharging ink.

24. An ink jet recording apparatus according to claim 23, wherein said interval is a gap which occurs when said recording head is arranged in a full-time printable state.

25. An ink jet recording apparatus including a recording head capable of discharging ink and recording on a recording medium conveyed along a conveyance route and in no contact with said recording head, said ink jet recording apparatus comprising:

first means for accommodating a sheet-like ink absorber;

recovery treatment means for performing discharge recovery treatment by causing said recording head to discharge ink when said ink absorber faces said recording head;

second means for accommodating said sheet-like ink absorber which has absorbed said discharged ink; and conveyance means for conveying, in accordance with said discharge recovery treatment, said ink absorber from said first accommodating means through at least a part of said conveyance route so as to make said ink absorber in contact with said recording head and clean said recording head, and then for introducing said ink absorber into said second accommodating means.

26. An ink jet recording apparatus according to claim 25, wherein said first accommodating means and said second accommodating means are integrally formed in a cassette member and said cassette member is detachable.

27. An ink jet recording apparatus according to claim 26, wherein said cassette member is arranged to be detachable and replaceable by a cassette accommodating said recording medium at the time of performing said discharge recovery treatment.

28. An ink jet recording apparatus according to claim 25, wherein said recording head has an electrothermal converting member for generating thermal energy for discharging ink.

29. A method of discharge recovery treatment of an ink jet recording apparatus comprising steps of:

conveying a sheet-like ink absorber by a mechanism for conveying a recording medium and absorbing ink discharged from a discharge port of a recording head by said ink absorber which has reached a position confronting said discharge port of said recording head;

absorbing said ink discharged from said discharge port by bringing said ink absorber into contact with said discharge port; and exhausting said ink absorber which has a region in which said ink is not absorbed.

30. An ink jet recording apparatus according to claim 29, wherein said recording head has an electrothermal converting member for generating thermal energy for discharging ink.

* * * * *

UNITED STATES PATENT AND TRADEMARK OFFICE
CERTIFICATE OF CORRECTION

PATENT NO. : 4,947,190 Page 1 of 8

DATED : August 7, 1990

INVENTOR(S) : Nobutoshi Mizusawa, et al.

It is certified that error appears in the above-identified patent and that said Letters Patent is hereby corrected as shown below:

ON THE TITLE PAGE

AT [22], FILED:

"November 10, 1989" should read --Nov. 10, 1988--.

AT [56], REFERENCES CITED:

"Cruz-Vribe" should read --Cruz-Uribe--.

COLUMN 2:

Line 8, "forcedly" should read --forcibly--;

Line 9, "U.S. Pat. No. 4276554," should read --U.S. Pat. No. 4,276,554,--;

Line 10, "U.S. Pat No. 4599625, U.S. Pat. No. 4419677," should read --U.S. Pat. No. 4,599,625, U.S. Pat. No. 4,419,677,--

Line 11, "No. 4543591, U.S. Pat. No. 4410900," should read --No. 4,543,591, U.S. Pat. No. 4,410,900, and--;

Line 12, "4383263)." should read --4,383,263).--;

Line 41, "forcedly" should read --forcibly--;

Line 57, "port" should read --ports--; and

Line 62, "be" should be deleted.

UNITED STATES PATENT AND TRADEMARK OFFICE
CERTIFICATE OF CORRECTION

PATENT NO. : 4,947,190

DATED : August 7, 1990

INVENTOR(S) : Nobutoshi Mizusawa, et al.

It is certified that error appears in the above-identified patent and that said Letters Patent is hereby corrected as shown below:

COLUMN 3:

Line 6, "replace" should read --reduce--;

Line 35, "applied" should read --devised--.

COLUMN 4:

Line 33, "an" should read --a--.

COLUMN 5:

Line 35, "not shown" should read --(not shown)--;

Line 41, "head JIH" should read --head IJH--;

Line 42, "passes" should read --paths--;

Line 54, "affection of the ink is not made" should be deleted;

Line 55, "upon" should be deleted and "portion 103" should read --portion 103 is not affected--;

Line 57, "the affection of the ink" should be deleted;

Line 58, "make upon" should read --affect--.

Line 62, "pass." should read --path.--; and

Line 66, "the affection of" should be deleted and "from" should read --from affecting--.

UNITED STATES PATENT AND TRADEMARK OFFICE
CERTIFICATE OF CORRECTION

PATENT NO. : 4,947,190 Page 3 of 8

DATED : August 7, 1990

INVENTOR(S) : Nobutoshi Mizusawa, et al.

It is certified that error appears in the above-identified patent and that said Letters Patent is hereby corrected as shown below:

COLUMN 6:

Line 29, ""PTn" should read --PTN--; and

Line 61, "judge" should read --judgment--.

COLUMN 7:

Line 5, "two" should be deleted;

Line 27, "plunger PTN" should read --platen PTN--;

Line 35, "FDSK into" should read --FDSK be brought into--;

Line 38, "is" should read --in--; and

Line 64, "cassette" (first occurrence) should be deleted and "inserted" should read --inserted cassette--

COLUMN 8:

Line 37, "ignited" should read --activated-;

Line 41, "forcedly" should read --forcibly--; and

Line 63, "if the" should read --a--.

UNITED STATES PATENT AND TRADEMARK OFFICE

CERTIFICATE OF CORRECTION

PATENT NO. : 4,947,190

DATED : August 7, 1990

INVENTOR(S) : Nobutoshi Mizusawa, et al.

It is certified that error appears in the above-identified patent and that said Letters Patent is hereby corrected as shown below:

COLUMN 9:

Line 16, "can" should be deleted; and "remained by" should read --equal to--;

Line 35, "Pump" should read --pump--;

Line 64, "parts the" should read --parts: the--; and

Line 67, "joined the" should read --joined to the--.

COLUMN 11:

Line 8, "the that" should read --that the--; and

Line 54, "paper supplying roller paper" should read --paper supplying roller PSR--;

Line 56, "PTN According" should read --PTN. According--.

COLUMN 12:

Line 2, "rotation" should read --rotating--;

Line 16, "slight" should read --similar--;

Line 30, "ARM1" should read --arm ARM1--;

CERTIFICATE OF CORRECTION

PATENT NO. : 4,947,190 Page 5 of 8

DATED : August 7, 1990

INVENTOR(S) : Nobutoshi Mizusawa, et al.

It is certified that error appears in the above-identified patent and that said Letters Patent is hereby corrected as shown below:

Line 38, "ARM2" should read --arm ARM2-- and "rotatable" should read --rotatably--; and Line 60, "pulley PRESS" should read --pulley PRES--.

COLUMN 13:

Line 5, "this" should read --that--;

Line 21, "mean" should read --means-- and "forcedly" should read --forcibly--;

Line 30, "similarly" should read --similar--;

Line 36, "hose device H," should read --host device H,--.

COLUMN 14:

Line 20, "decreased" should read --decreases--;

Line 30, "forcedly" should read --forcibly--;

Line 40, "the the" should read --the--;

Line 47, "paper CP at" should read --paper CP is fed at--; and

Line 65, "corresponds to" should be deleted.

UNITED STATES PATENT AND TRADEMARK OFFICE

CERTIFICATE OF CORRECTION

PATENT NO. : 4,947,190

DATED : August 7, 1990

INVENTOR(S) : Nobutoshi Mizusawa, et al.

It is certified that error appears in the above-identified patent and that said Letters Patent is hereby corrected as shown below:

COLUMN 15:

Line 11, "can be remained." should read --remains--;

Line 39, "other" should read --another--;

Line 47, "buttom" should read --bottom--;

Line 56, "eral, any different" should read --erally no difference--.

COLUMN 17:

Line 29, "remained" should read --remaining--; and

Line 37, "adheres" should read --adheres to--.

COLUMN 18:

Line 11, "recording guide" should read --recording medium--;

Line 24, "an" should read --a--;

Line 40, "Miler" shold read --Mylar--;

Line 64, "members, this" should read --members. This--; and

Line 67, "forcedly" should read --forcibly--.

UNITED STATES PATENT AND TRADEMARK OFFICE

CERTIFICATE OF CORRECTION

PATENT NO. : 4,947,190

DATED : August 7, 1990

INVENTOR(S) : Nobutoshi Mizusawa, et al.

It is certified that error appears in the above-identified patent and that said Letters Patent is hereby corrected as shown below:

COLUMN 19:

Line 7, "step S810" should read --step S801,--;

Line 24, "step S7." should read --step S804.--; and

Line 27, "it performing" should read --it starts performing--.

COLUMN 20:

Line 20, "forcedly" should read --forcibly--;

Line 28, "if the" should read --after--;

Line 37, "conveyance port 9" should read --insertion port--;

Line 49, "conveyance" should read --insertion--;

Line 50, "port 9." should read --port--; and

Line 54, "un-used" should read --unused--.

UNITED STATES PATENT AND TRADEMARK OFFICE
CERTIFICATE OF CORRECTION

PATENT NO. : 4,947,190 Page 8 of 8

DATED : August 7, 1990

INVENTOR(S) : Nobutoshi Mizusawa, et al.

It is certified that error appears in the above-identified patent and that said Letters Patent is hereby corrected as shown below:

COLUMN 21:

Line 23, "portion" should read --portions--;

Line 27, "portion" should read --portions--; and

Line 56, "forcedly" should read --forcibly--.

COLUMN 22:

Line 47, "used" should read --used- --; and

Line 50, "remain" should read --maintain--.

COLUMN 23:

Line 5, "in step S5" should be deleted; and

Line 63, "an" should read --and--.

Signed and Sealed this

Twentieth Day of July, 1993

Attest:

Michael K. Kirk

MICHAEL K. KIRK

*Attesting Officer* *Acting Commissioner of Patents and Trademarks*